United States Patent [19]

Schneider et al.

[11] Patent Number: 5,587,533
[45] Date of Patent: Dec. 24, 1996

[54] SURFACE FEATURE MAPPING USING HIGH RESOLUTION C-SCAN ULTRASONOGRAPHY

[75] Inventors: John K. Schneider, Snyder, N.Y.; William E. Glenn, Ft. Lauderdale, Fla.

[73] Assignee: Ultra-Scan Corporation, Amherst, N.Y.

[21] Appl. No.: 379,004

[22] Filed: Jan. 27, 1995

Related U.S. Application Data

[60] Continuation of Ser. No. 33,800, Jan. 13, 1993, abandoned, which is a division of Ser. No. 610,429, Nov. 7, 1990, Pat. No. 5,224,174.

[51] Int. Cl.$^6$ .......................... G01N 29/06; A61B 8/00
[52] U.S. Cl. .......................... 73/614; 128/660.09
[58] Field of Search .......................... 73/602, 610, 614, 73/620, 621, 629, 633, 642; 128/660.07, 660.08, 660.09, 660.1

[56] References Cited

U.S. PATENT DOCUMENTS

| | | | |
|---|---|---|---|
| 3,480,002 | 11/1969 | Flaherty et al. | 73/621 |
| 4,237,902 | 12/1980 | Okazaki | 73/610 |
| 4,325,381 | 4/1982 | Glenn | 73/620 |
| 4,362,058 | 12/1982 | Abele | 73/599 |
| 4,385,831 | 5/1983 | Ruell | 382/4 |
| 4,434,799 | 3/1984 | Taenzer | 73/642 |
| 4,457,174 | 7/1984 | Bar-Cohen et al. | 73/620 |
| 4,542,746 | 9/1985 | Takamizawa | 73/626 |
| 4,799,177 | 1/1989 | Sarr | 73/628 |
| 4,917,096 | 4/1990 | Englehart et al. | 73/633 |

*Primary Examiner*—John E. Chapman
*Attorney, Agent, or Firm*—Hodgson, Russ, Andrews, Woods & Goodyear LLP

[57] ABSTRACT

An ultrasonic system and method for imaging a surface wherein a C-mode ultrasonic scan is performed over a fixed area of the surface and range gating is applied to that area to a given depth below the surface. For use of the system and method in fingerprint imaging, a live finger is placed upon a sensitive surface, the portion of the finger on the surface is scanned using the ultrasonic energy, and ultrasonic energy returned from the finger portion is received to capture an electronic image of the pattern of ridges and valleys of the fingerprint. The ultrasonic imaging system comprises a probe for providing a directed output ultrasonic beam to scan the surface and to receive ultrasonic echos from the surface, a pulser-receiver to cause the probe to provide the output beam and to provide signals in response to the returned ultrasonic echos, a signal processing circuit for detecting and processing return echo signals from the pulser-receiver and a computer for storing and displaying information contained in signals from the processing circuit and for controlling operation of the processing circuit. The probe scans the surface along one direction, and then along another direction, the two directions preferably being orthogonal.

7 Claims, 29 Drawing Sheets

SURFACE FEATURE MAPPING USING HIGH RESOLUTION C-SCAN ULTRASONOGRAPHY

This a continuation of application Ser. No. 08/033,800 filed on Jan. 13, 1993, now abandoned, which is a division of Ser. No. 07/610,429 filed Nov. 7, 1990 now U.S. Pat. No. 5,224,174.

BACKGROUND OF THE INVENTION

This invention relates to the art of surface scanning and imaging, and more particularly to a new and improved ultrasonic method and apparatus for surface scanning and imaging.

One area of use of the present invention is in fingerprint scanning and imaging, although the principles of the present invention can be variously applied to imaging surface topology using ultrasound. In optical techniques for fingerprint scanning, reflections from small air pockets under the fingerprint ridges reduce the image quality thereby requiring image processing techniques which are quite complex and costly to implement and which themselves can cause unwanted artifacts or possibly remove valid components of the image. Another problem with optical techniques is that once the ridge structure of a finger is worn smooth enough optical systems no longer are able to acquire good quality images.

It would, therefore, be highly desirable to provide a system and method for imaging surface topology which provides high quality images thereby reducing the complexity and cost of subseqent image processing and which, in the case of personal identification, has the capability of imaging structures which lie beneath the surface of the skin which can be used for identification.

SUMMARY OF THE INVENTION

It is, therefore, a primary object of this invention to provide a new and improved system and method for imaging surface topology.

It is a further object of this invention to provide such a system and method which provides high quality images so as to reduce the complexity and cost of subsequent image processing.

It is a more particular object of this invention to provide such a system and method for use in fingerprint scanning and imaging.

It is a further object of this invention to provide such a system and method for use in personal identification which has the capability of subdermal imaging.

It is a more particular object of this invention to provide such a system and method which is efficient and effective in operation and which is relatively simple in structure.

The present invention provides an ultrasonic system and method for imaging a surface wherein a C-mode ultrasonic scan is performed over a fixed area of the surface and range gating is applied to that area at a selected location from the surface to a given depth below the surface. For use of the system and method in fingerprint imaging, a live finger is placed upon a scannable surface, the portion of the finger on the surface is scanned using the ultrasonic energy, and ultrasonic energy returned from the finger portion is received to capture an electronic image of the pattern of ridges and valleys of the fingerprint.

The ultrasonic imaging system comprises a probe for providing a directed output ultrasonic beam to scan the surface and to receive ultrasonic echoes from the surface, a pulser-receiver to cause the probe to provide the output beam and to provide signals in response to the returned ultrasonic echoes, signal processing means for detecting and processing return echo signals from the pulser-receiver and a computer for storing and displaying information contained in signals from the processing means and for controlling operation of the processing means. The probe includes first means for scanning the surface along one direction, second means for scanning the surface along another direction, the two directions preferably being orthogonal. In accordance with another aspect of the present invention, the fingerprint image is analyzed in the spatial frequency domain.

The foregoing and additional advantages and characterizing features of the present invention will become clearly apparent upon a reading of the ensuing detailed description together with the included drawing wherein:

BRIEF DESCRIPTION OF THE DRAWING FIGURES

Figure 27:
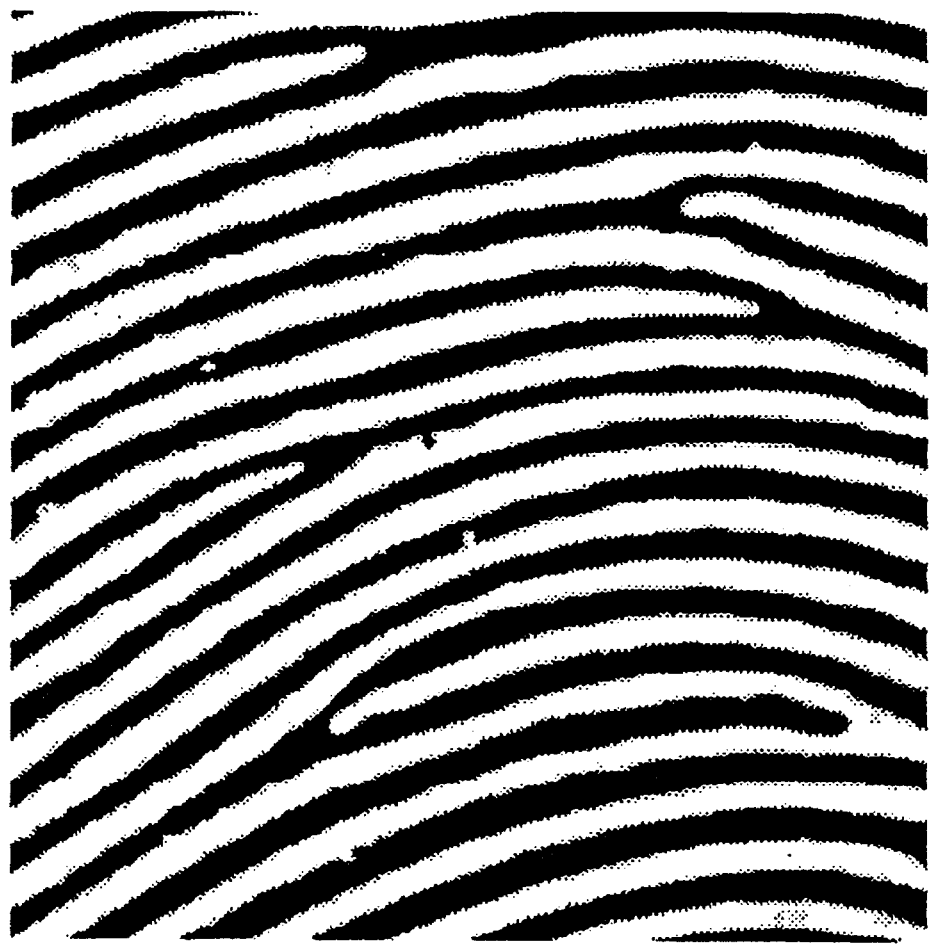
FIG. 27 is an enlarged grey scal fingerprint image.
Figure 32:
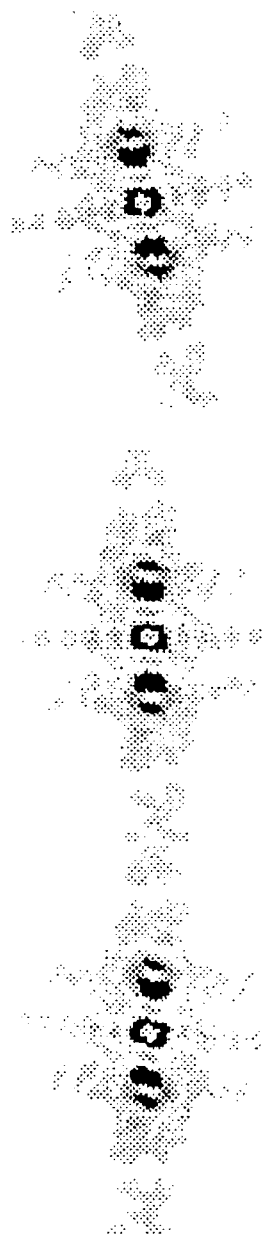
Figure 32:
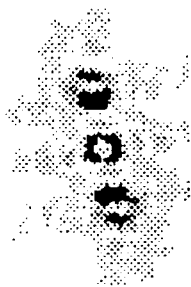
Figure 32:
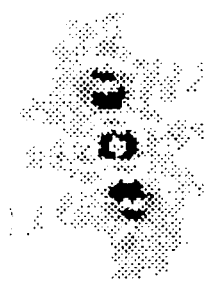
Figure 32:
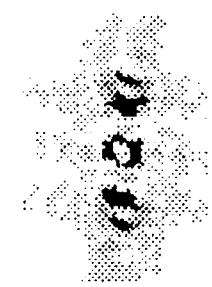
Figure 33:
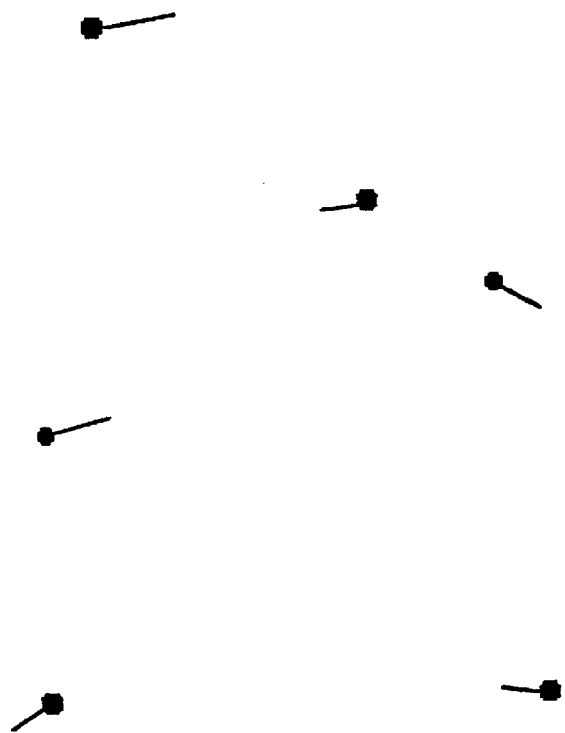

FIGS. 32a–f are enlarged images of spatial freuqncy representations of detected minutia from a spatial frequency analysis of the fingerprint of FIG. 27; and FIG. 33 is a map of the detected minutia of FIG. 32.

DETAILED DESCRIPTION OF THE ILLUSTRATED EMBODIMENTS

Figure 1:
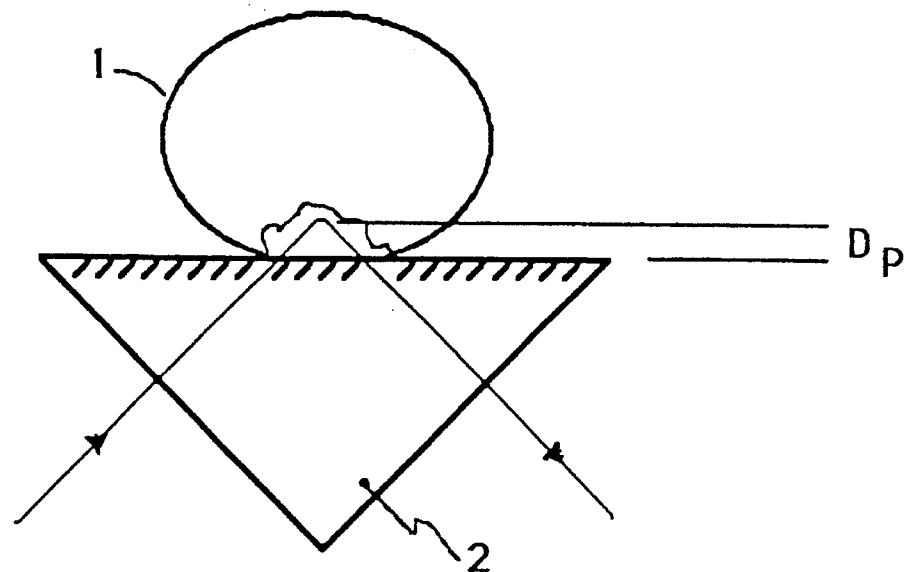
FIG. 1 is a diagrammatic view illustrating an aspect of optical fingerprint scanning.

A more complete understanding of the ultrasonic method and apparatus for surface scanning according to the present invention perhaps can be obtained best from a brief consideration of optical systems. The almost unlimited number of optical imaging systems presently in existence use a multitude of different approaches to scanning that are targeted at many different applications. However, for purposes of illustration, only those systems that rely on Frustrated Total Internal Reflection or FTIR as the basis for obtaining an image will be considered. The theory of FTIR is that light incident on an interface going from a higher index of refraction to a lower one will be totally reflected if the incident angle is large enough. If on the other hand the incident of refraction between the two surfaces is closely matched, a significant amount of absorption and scattering takes place. Several systems use this concept as the basis for generating an image. One of the more classical examples and the one which will be emphasized herein is that of fingerprint scanning. Referring to FIG. 1, a finger 1 is placed upon an optical interface such as a prism 2 and a light source (usually a laser) scans the finger to obtain an image, relying on the ridges of the finger to completely contact the surface of the prism thus causing the light source to be scattered. However, often small air pockets form under the ridges thereby reflecting the light as opposed to scattering it. This creates a very poor quality image that must be improved by image processing techniques. Often, these image processing techniques or algorithms cause unwanted artifacts or possibly remove valid components of the image. Always, these techniques are quite complex and costly to implement.

However, prior to understanding the problems associated with scanning the fingerprint, general fingerprint pattern recognition theory must first be understood.

A variety of fingerprint processing algorithms have been developed and experimented with over the years, each with a varying degree of success. The basic idea behind all of these algorithms is to identify and locate unique points of the fingerprint referred to as minutia. The two predominant types of minutia are ridge endings and bifurcations. A ridge ending is formed when a ridge of a fingerprint no longer continues along its path, it simply stops or ends. A bifurcation on the other hand is formed when a ridge of a fingerprint splits (bifurcates) into two ridges or, conversely, when two ridges merge into one ridge. Fingerprint identification algorithms are concerned with identifying every minutia of the fingerprint (both ridge endings and bifurcations) and associating with each minutia found, three positional identifiers (x, y, and theta). These three parameters locate the minutia in an arbitrary (but fixed) cartesian coordinate system where x and y map the position of the minutia and theta defines its angle of orientation with respect to one of the axes. A match between two fingerprints is made when the x, y, and theta of one fingerprint match (or nearly match) the x, y, and theta of another print.

Essentially, there are two basic methodologies which have been used to provide an image of the fingerprint to be processed. The first technique is to generate an inked impression of the fingerprint. This is done by applying ink to the finger to be printed and rolling the finger onto a piece of paper or cardboard. The inked image is then placed under an optical scanner where it is scanned, digitized and placed into the memory of the computer responsible for processing the fingerprint. There are, however, a number of problems and deficiencies with this approach especially when viewed in the realm of security systems. The first and foremost deficiency with this approach is the need to ink an individual's finger or hand. Certainly in some applications such as law enforcement, the inconviencing of the individual being printed is not a primary concern. However, if the application is general security such as that which is required for access control, the inconviencing of the individual is of prime importance and generally rules out the use of any type of inking procedure.

The second concern with this approach falls into the category of equipment and material use. Over several years it has been demonstrated that standardizing the type of ink to be used, along with the material it is to be printed on, is not as trivial of a problem as it appears. Furthermore, different inks and different papers all affect the overall final quality of the image as it is scanned into the computer.

The third (and certainly not last) problem with this procedure is the training of the individual responsible for obtaining the print. Factors such as too little ink, too much ink, improper pressure on the finger when rolling, etc., greatly affect the overall outcome of the image. In addition, if the individual to be printed is resistant to being printed in any way, the potential for obtaining a good quality print is far less.

The second methodology for obtaining an image of a fingerprint is to scan the finger directly. This approach is referred to as "live scan". The idea behind the devices used to scan the finger is based on the concept of Frustrated Total Internal Reflection or FTIR. Live scan readers that employ this technique rely on the fact that the interface established between the finger and the optical surface (usually a prism but perhaps a lens) can generate both reflection and scattering based upon the relative indices of refraction of the fingerprint valleys and ridges versus the glass prism. That is, the prism has a high index of refraction. When interfaced to a valley of a fingerprint (i.e. air) which has a low index of refraction, the light is reflected back to a photosensor for data conversion and storage when the prism is interfaced to a much higher index of refraction such as skin (i.e., the ridge of the fingerprint), the light is scattered and absorbed. The amount of light reflected back to the photosensor is significantly less than before. The recorded image is a grey scale image of the fingerprint.

The single most important problem behind using the concept of FTIR for fingerprint imaging lies in the ability to ensure that the ridge of the finger completely comes in contact with the optical element. Often, the finger is very dry and lacks any type of skin oil or moisture. As a result, when a finger is placed down upon the optical interface, small air gaps, although microscopic in size, are thick enough to completely reflect the light back to the photosensor and thus be interpreted as a valley (the space between the fingerprint ridges) instead of a ridge. The net effect is a very spotty image. These spots may eventually be detected as false minutiae and therefore cause the fingerprint to be improperly matched against other fingerprints.

In addition to air pockets between the ridge of the finger and the glass interface being formed by dry skin, two other similar conditions must be considered. They are irregularly shaped ridges and sweat pores. Irregularly shaped ridges are those ridges that have nicks and gouges in them and this type of ridge occurs quite often. This too results in air pockets being formed at each nick and gouge. Sweat pores also present a similar problem. Sweat pores are tiny openings found along the ridge structure and appear in the final image when scanned optically. However, when a fingerprint is obtained using an inking process, these sweat pores are filled in with ink and never seen. This results in two completely different images of the same finger which causes significant problems for the image processing software.

Another type of problem occurs if the finger to be imaged is extremely oily or moist as opposed to extremely dry. In this case, the entire ridge of the finger is coated with a thin film of oil. The skin oil with its index of refraction acts very similar to the air pockets caused by dry skin and causes the incident light ray to be completely reflected as opposed to scattered by the irregular surface of the ridge. Here, the entire ridge is unable to be imaged and the print image becomes completely unreadable. This results from the fact that the thickness of the oil or moisture needed to completely reflect the incident light wave is very thin. The actual "thickness" needed to reflect the light is defined by how deep the light will travel into the second medium before it is completely reflected. This depth, known, as the depth of penetration, is a function of the wavelength of the incident light used and the index of refraction (n1 and n2) of the two interfacing surfaces. Referring to FIG. 1, the depth of penetration is given by $$dp = \frac{(\text{wavelength}/n1)}{2[\sin^2(\text{theta}) - (n2/n1)^2]^{1/2}} \quad (1)$$

Assuming that the optical element is glass and that the interfacing medium is air, then for an angle of incidence of 45°, the thickness of the air pocket needed to completely reflect a light wave of wavelength equal to 3 um is given by $$dp = 902 \text{ nm} \quad (2)$$

Figure 2:
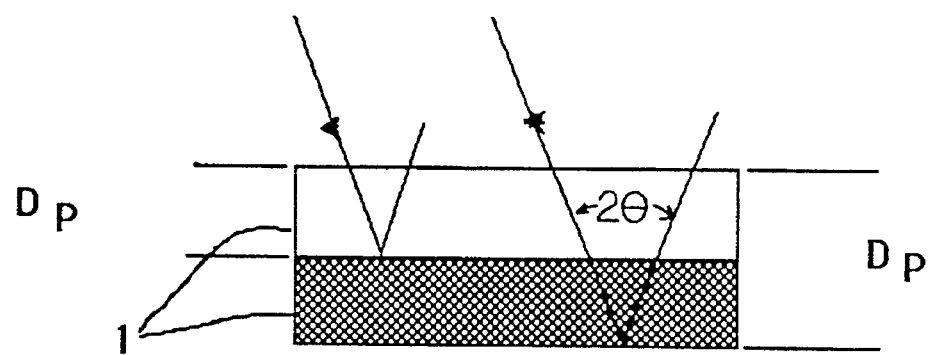
FIG. 2 is a diagrammatic view illustrating aspects of depth of penetration in optical scanning.

Thus, for air pockets of thickness greater than that defined in equation (2), the underlying ridge structure is never seen by the light ray. As can be seen from equation (1), the depth of penetration can be altered by changing the frequency of the incident light, the angle of incidence, or the index of refraction (of the optical element usually via some form of surface coating). This effect is shown in FIG. 2. In fact, all of these parameters have been the subject of much research in the hopes of defining an optimum set of parameters. Although great improvements were able to be achieved, this fundamental problem is still a major source of poor image quality when optically imaging the finger directly.

Even with the improvements made to this approach, however, there are a number of problems that affect the overall implementation in a real world environment when interfacing to large masses of people. The first of these problems is that the image quality varies significantly between dry versus oily or wet fingers as previously discussed. This is partially due to the fact that dry fingers usually result in a thin layer if air existing between the ridges of the finger and the prism. In these cases, it is very difficult to distinguish between ridges and valleys and the resulting image becomes very blotchy. Furthermore, it has been documented that the optical system is sensitive to not only dry versus wet fingers, but also smokers fingers versus non-smokers fingers, different skin colors, and the menagerie of dirt, grease and grime that can be found on the end of the fingers.

Finally, both of the above mentioned approaches (inking and live scan) suffer from a common shortcoming. It has been found over the years that certain occupations cause the ridge structures of the finger to be worn very thin. Occupations that require the repeated handling of abrasive surfaces such as banktellers handling money, bricklayers, etc. Once the ridge structure is worn fine enough, the optical systems are no longer able to acquire good quality images since the surface structure is not even there to image. This is a significant shortcoming of these approaches since one of the very institutions that could utilize a high security system based on fingerprint identification is the banking industry.

However, unlike optics, an ultrasound approach according to the present invention offers the ability to image below the surface of the finger. Therefore, if no ridge structure exists or if the ridge structure is too fine to produce a reasonable signal to noise ratio, then sub-dermal features can be used as a means of identification. Any unique sub-dermal structure could be used for this purpose with special attention being given to the arteries and veins. It is well known that the arteries and veins of the fingers are quite numerous and even different between the left and right sides of an individual. Therefore, by obtaining an image of these structures, a person's identity can be established much like using the fingerprint. Thus using ultrasound according to the present invention provides a means for obtaining these images which, when used in conjunction with the fingerprint, will produce substantially higher performance ratios with respect to the accuracy of recognition, i.e. false acceptance rates and false rejection rates.

Figure 3:
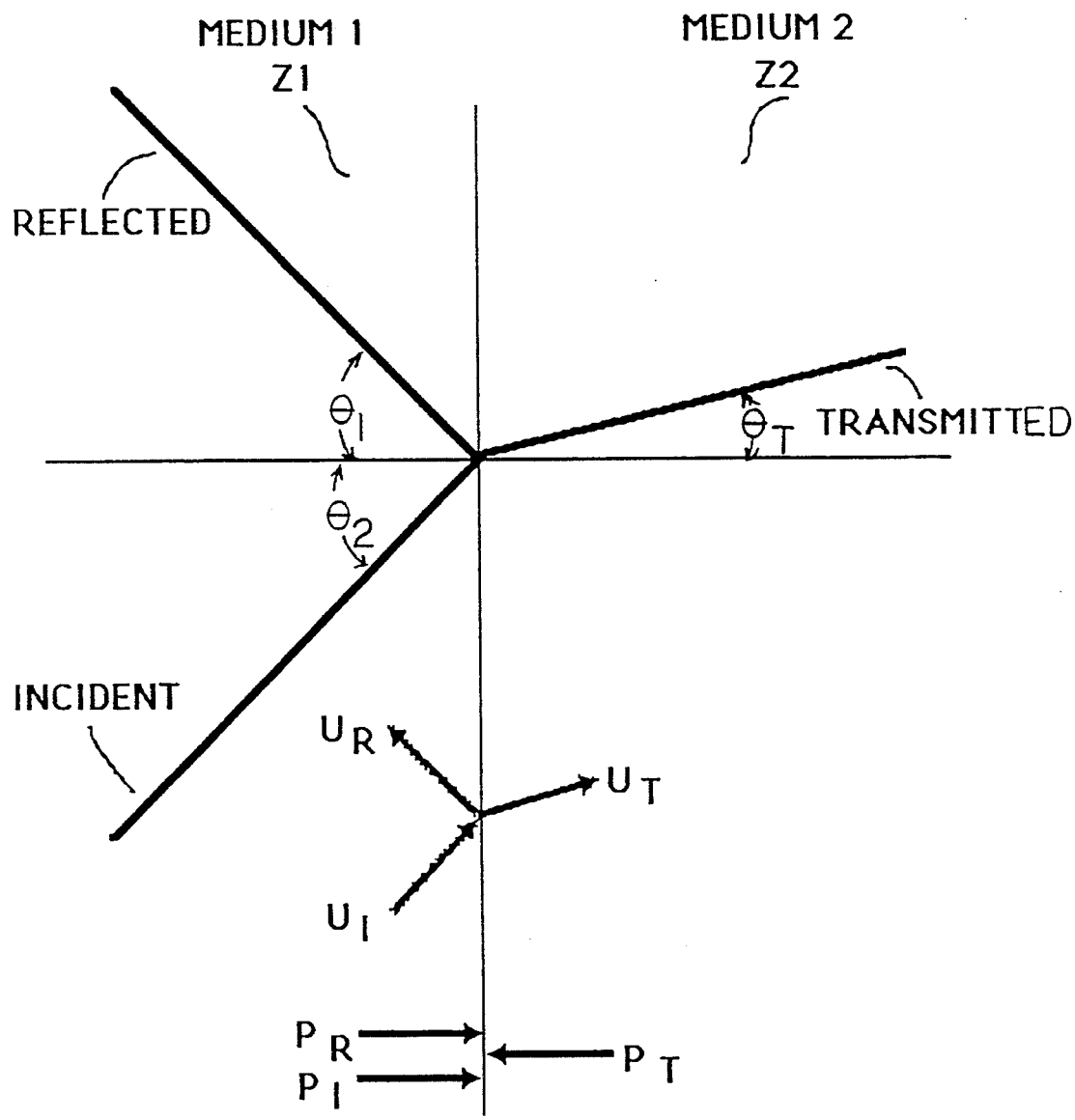
FIG. 3 is a diagrammatic view illustrating reflection and transmission of ultrasound at an interface.

The basic principle behind the ability to use ultrasound as an imaging modality is governed by the principles of general wave theory analysis and common to several other modalities in one form or another (i.e. optical, electromagnetic, etc.). The principle is that an acoustic wave upon striking an interface will be partially transmitted and partially reflected provided that an acoustical impedance mismatch exists at the interface. Therefore, by collecting the echoes of the transmitted wave, an overall image of the acoustical discontinuities of the object in question can be made. When an ultrasonic beam strikes a surface that is smooth and regular (such as the valley of air found in a fingerprint), the angle at which it is reflected is quite predictable and is referred to as a specular return echo. However, when the beam strikes an irregular shaped surface (such as the ridges of the fingerprint or the blood vessels internal to the finger) the beam is scattered in many directions and is referred to as a scattered return echo. In the case of a specular reflector as shown in FIG. 3, the amount of reflection that is caused by the interface is dependent upon the ratio of the acoustical impedances of the two interfaces and the angle at which the incident wave strikes the interface.

It is imperative to understand the reflection and transmission behavior of ultrasound upon striking a very thin gap such as a small air pocket. For the purposes of this explanation, a small air gap internal to a second structure shall be used as an example. As an incoming acoustic wave of unlimited length strikes the air gap, the wave is split into a reflected and transmitted wave. After passing through the air gap, the transmitted wave is again split a second time. The result is a sequence of reflections in both directions inside the air gap. On either side a sequence of waves leaves the air gap which are superimposed. The individual waves are intensified or weakened depending on the phase position.

Letting $Z_1$ represent the acoustic impedance of the the material and $Z_2$ represent the acoustic impedance of air, then the ratio of the two impedances can be abbreviated by $$m = Z_1/Z_2 \qquad (3)$$

Defining the thickness of the air gap to be d, then an expression for the acoustic transmittance D and the acoustic reflectance R is given by $$D = \frac{1}{[1 + .25\,(m - 1/m)^2 \sin^2(2\,d/\text{wavelength})]^{1/2}} \qquad (4)$$

and $$R = \frac{.25\,(m - 1/m)^2 \sin^2(2\,d/\text{wavelength})}{1 + .25\,(m - 1/m)^2 \sin^2(2\,d/\text{wavelength})^{1/2}} \qquad (5)$$

Both expressions are periodical and have a minimum and maximum value as regular intervals as defined by minima of R and maxima of D occuring at d/wavelength=0, 1/2, 2/2, 3/2, etc. and maxima of R and minima of D occuring at d/wavelength=1/4, 3/4, 5/4, etc. These relationships hold only for infinitely long waves, i.e. continuous waves. However, in the case of the very thin air gap, even a short pulse is equivalent to a wave train of long duration because the width of the gap is much smaller than one wavelength. The results therefore apply to pulse transmission. The reflection coefficient R is the ratio of the reflected acoustic pressure wave Pr to the incident acoustic pressure wave Pi or R=Pr/Pi, assuming the reflecting interface is infinitely thick (several wavelengths). The reflection coefficient for very fine air gaps, i.e. thin interface, in any material can be calculated from equation (5). The significance is that if the air gap is thin enough the reflectivity is near zero. This allows imaging past thin layers of air trapped between the finger and lens which is not possible by the optical approach. Reflection coefficients of 1% are readily measured yet, when viewing the transmittance, virtually no change is detectable with such a fine gap.

An important component of an ultrasonic imaging system is the probe which in turn, includes the piezoelectric transducer, the required lensing system, mirrors, rotating prisms, etc. The transducer requirements or parameters are tightly coupled to the specific application and for the most part are concerned with resolution and attenuation. These parameters include frequency, quality factor, axial resolution, lateral resolution and focal length.

The selection of the desired operating frequency for the piezoelectric transducer is determined by the attenuation coefficient of the propagating medium, depth of penetration, and resolution required for the particular application. Generally, the limiting resolution (and the more critical one for C-scan imaging which will be discussed presently) is lateral or traverse resolution as opposed to axial or longitudinal resolution as will also be described. The lateral resolution of an ultrasonic imaging system is directly proportional to the frequency of the system. A good 'rule of thumb' is that the maximum resolution that can be obtained is on the order of a single wavelength. The wavelength of ultrasound in water at a frequency of 30 MHz for example, can be calculated as follows:

$$\text{wavelength} = \frac{\text{velocity of sound in water (meters/second)}}{\text{frequency (cycles/second)}}$$

$$= (1500 \text{ m/s})/30 \times 10^6 \text{ cycles/sec}$$

$$= 0.5 \times 10^{-6} \text{ meters/cycle}$$

$$= 0.05 \text{ mm/cycle}$$

$$= 0.002 \text{ "/cycle}$$

Two other influencing factors on operating frequency are the attenuation coefficient of the propagating medium and the depth of penetration required to obtain the image. There are essentially four causes of wave attenuation in a medium:

1. Divergence of the wavefront
2. Elastic reflection at planar interfaces
3. Elastic scattering from irregularities or point scatterers
4. Absorption.

Many materials, including human tissue, have been empirically characterized with respect to their acoustic attenuation. The measure is a composite of the above mentioned causes of attenuation and is usually given in terms of db/MHz/cm. Table I gives the acoustic attenuation of some biological samples at a frequency of 1 MHz. As is easily calculated, the return signal level of an ultrasonic beam operating at 30 MHz in soft tissue and imaging a vessel 1 cm below the surface is:

$$= (1.5 \text{ db})(30 \text{ MHz}) (2 \text{ cm round trip distance})$$

$$= 90 \text{ db}$$

It is very easy to quickly exceed the signal to noise ratio of any high sensitivity receiver used to process the return signal. Thus, a practical limit exists between the required resolution and depth of penetration needed for obtaining an image.

TABLE I

| Acoustic Attenuation at 1 MHz | |
|---|---|
| Material | Attenuation Coefficient (db/cm) |
| Air | 10 |
| Blood | 0.18 |
| Bone | 3–10 |
| Lung | 40 |
| Muscle | 1.65–1.75 |
| Soft Tissue | 1.35–1.68 |
| Water | 0.002 |

The quality factor or 'Q' of a transducer is a measure of its frequency response about its resonant frequency. The Q of a transducer is directly related to the axial resolution of the system as well as the amount of radiated acoustic energy.

Very high Q transducers have poor axial resolution and radiate small amounts of acoustic power. These transducers are highly efficient however and are usually operated in a continuous wave (cw) mode as in the case of doppler flowmeters. Low Q transducers offer very high resolutions and radiate considerably more acoustic energy into the neighboring medium(s). These transducers are usually operated pulsed mode as in pulse-echo imaging systems.

Figure 4:
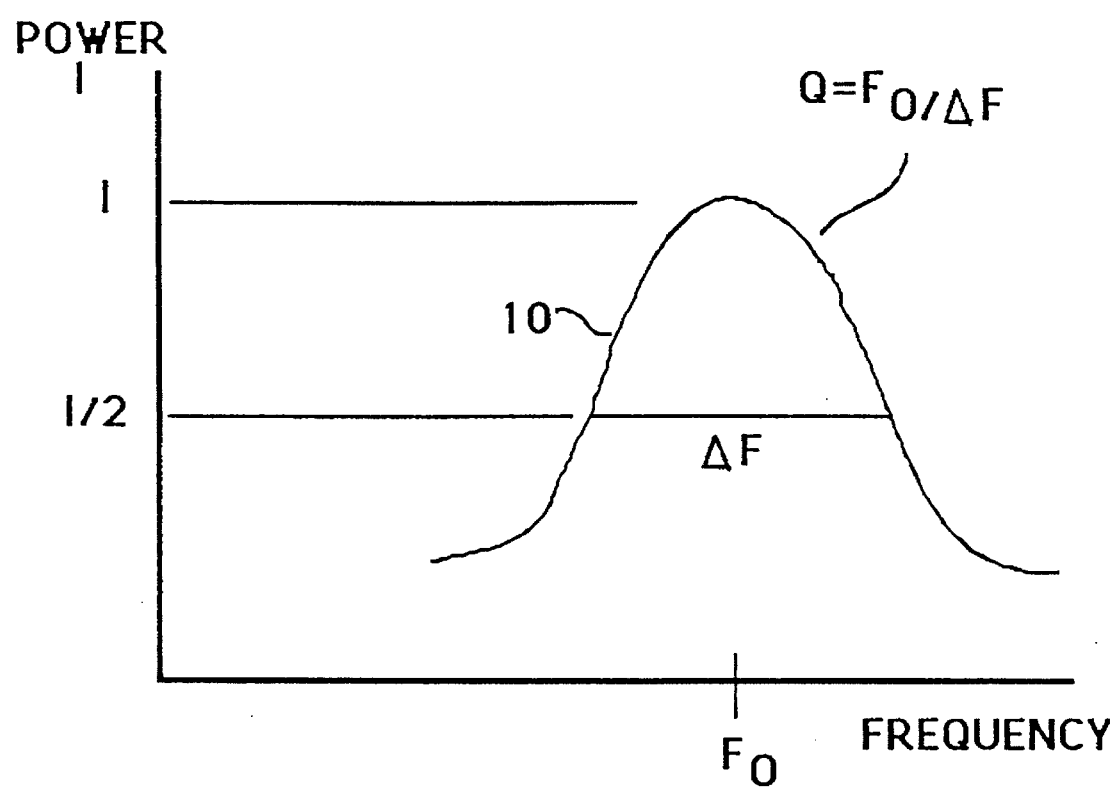
FIG. 4 is a graph in the form of the resonant curve of an ultrasonic transducer.

The Q of a transducer is calculated as the ratio of the resonant frequency to the frequency width of the half power points as shown by the curve 10 in FIG. 4 and is given by $$Q = f_1/\_f \quad (6)$$

Another form of the definition of Q in terms of energy is given by:

$$Q = \frac{\text{energy stored}}{\text{energy lost per cycle}} 2 \quad (7)$$

From this it is readily determined that as the amount of energy radiated from either or both faces of the piezoelectric element increases, i.e. energy lost per cycle increases, then the Q of the transducer decreases. Likewise the converse is also true. Thus, if the goal is to design a system with a broadband frequency response, then the Q of the transducer must be low. To accomplish this, the mediums interfacing to the faces of the crystal must have matching or near matching impedances in order to maximize the radiated energy. In transducers used for biological scanning, the one face of the crystal is generally placed on the surface of the skin which represents a much better impedance match than that of air, thus immediately lowering the Q of the transducer. To ensure that no layers of trapped air lie between the face of the crystal and the surface of the skin, often a gel-like substance with an acoustic impedance similar to that of tissue is applied to the skin. Since the acoustic impedance of skin is generally several hundred times greater than that of the piezoelectric element, the overall effect on the Q of the transducer is minimum.

To lower the Q of the transducer even further, the back face of the transducer is generally mounted using some type of epoxy with an acoustic impedance much lower than that of air. This will cause energy to be lost through the back face as well as the front face. The overall effect is that the total amount of power available to radiate into the medium to be imaged has decreased, but this is generally overshadowed by the improved Q of the transducer. A concern in allowing energy to be lost through the back face is that it does not find its way back to the crystal resulting in some type of standing wave or artifact. Therefore, the epoxy used to mount the element is generally filled with particles of aluminum or tungsten. This turns the epoxy into a good ultrasonic absorber and the energy radiated from this face is lost.

Figure 5:
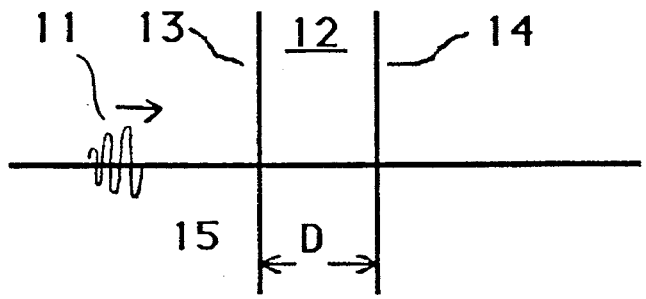
FIG. 5 is a diagrammatic view illustrating behavior of incident and echo ultrasonic pulses at two interfaces.
Figure 5:
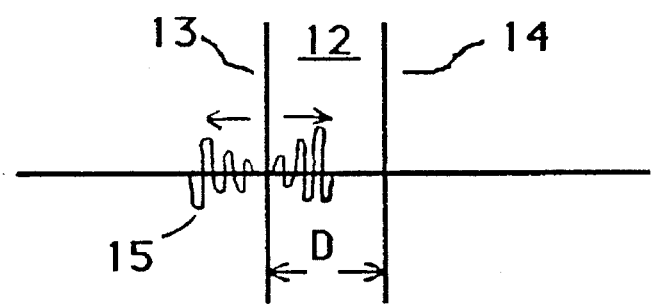
Figure 5:
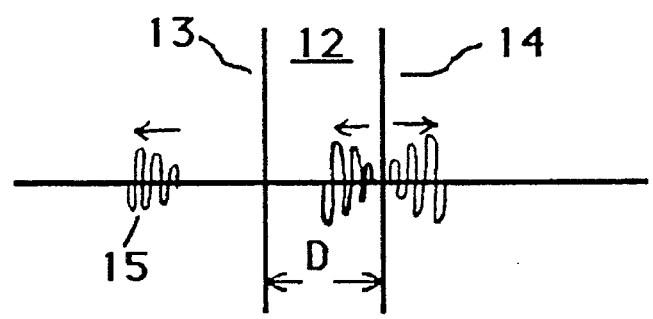
Figure 5:
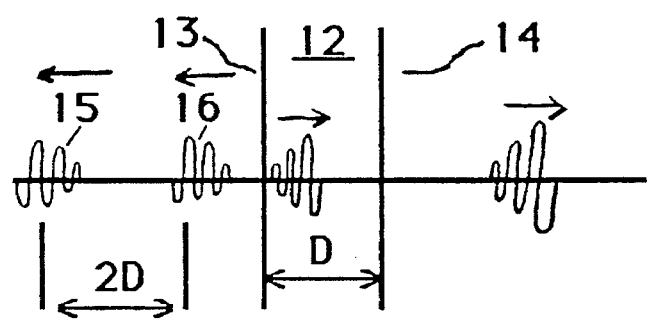

Axial resolution is the ability of a transducer to distinguish between two objects spaced in a plane parallel to the direction of beam propagation, also known as the longitudinal plane. As shown in FIG. 5, a single incident pulse 11 striking a medium 12 with two reflecting interfaces 13,14 causes two echoes 15,16 back to the transducer. To determine the distance between the two interfaces, the total time between echoes is measured (dividing by 2 for roundtrip time), and multiplied by the velocity of sound in that medium. Thus, a measure of axial resolution is given by the relationship $$d = tc/2.$$

From FIG. 5 it can be seen that as the two interfaces 13,14 are moved closer together, the time between successive echoes decreases. Eventually, as the two interfaces 13,14 are moved close enough together, the time between the two echoes 15,16 will no longer be distinguishable (i.e. the two echo pulses will appear as one long pulse to the receiving electronics). In order to provide as much separation as possible between the two echoes, it is desirable to have the ringing of the radiated pressure wave (and hence, the reflected wave) be as short as possible. Therefore, very low Q transducers are used when axial resolution is of prime importance. This is generally the case when multiple images at a variety of different depths are desired. In this case, the return echoes are only captured during a specific period of time. This time represents the round trip delay time associated with the particular depth or range that is being imaged. This technique is referred to as range gating and will be discussed in further detail presently.

Figure 6:
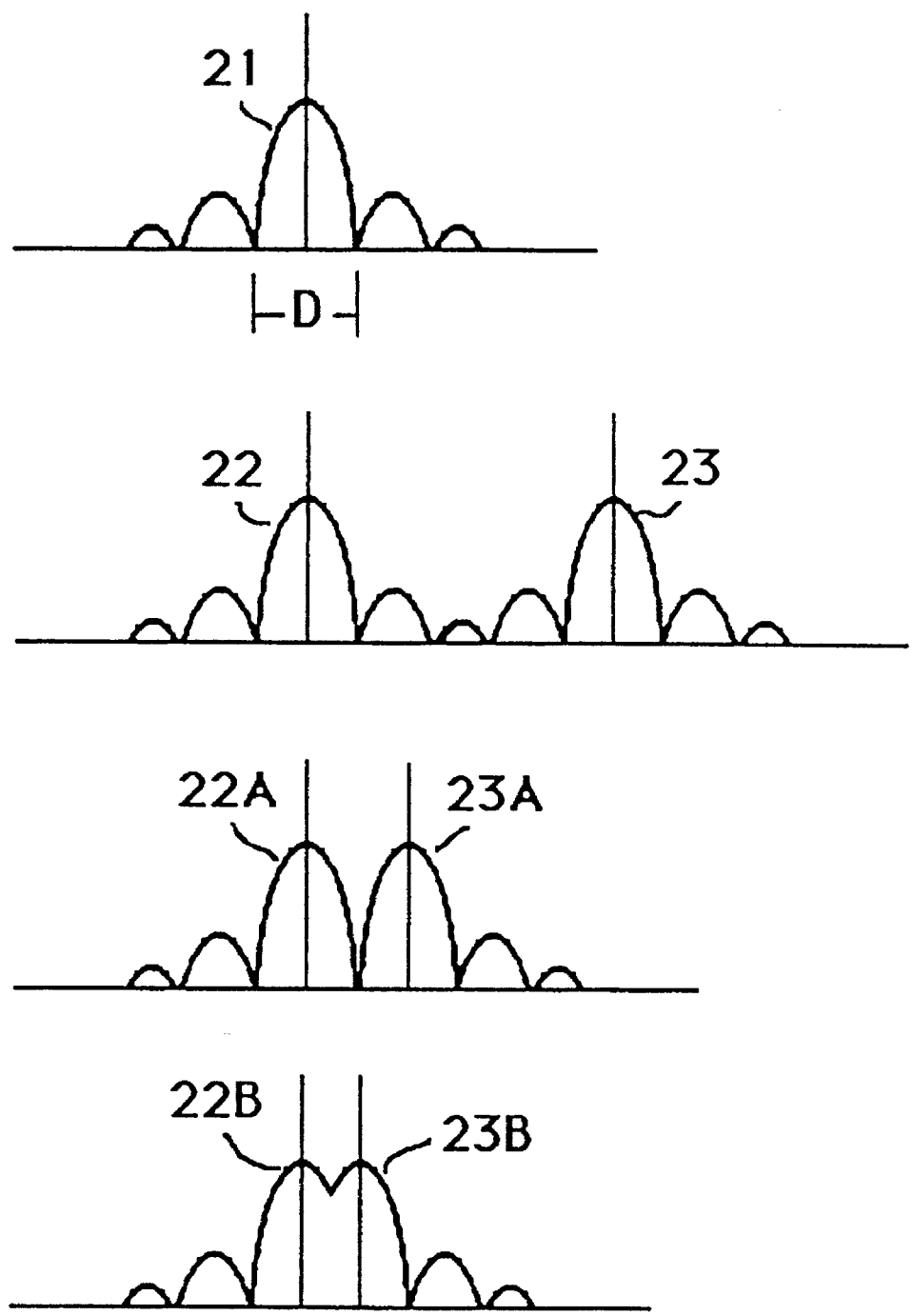
FIG. 6 is a diagrammatic view illustrating lateral resolution of return ultrasonic echos.

Lateral resolution is defined as the minimum distance that can be resolved between two points in the transverse plane. This distance is essentially dictated by the size of the beam as measured in the plane in which the objects reside. FIG. 6 provides a diagrammatic approach in determining lateral resolution. Two distinct objects are sonified by a beam 21 of beam width 'd' which is swept across the objects. When the objects are far apart (a distance greater than 'd'), two distinct echoes 22,23 are returned. Knowing the sweep rate of the transducer and measuring the time between the two returns, the distance between the two objects can be determined. As the objects are moved closer together, the return echoes also move closer together. When the return echoes appear right next to one another, yet still distinguishable, the distance between the two objects is the minimum resolvable distance. This distance is defined as the lateral resolution and as can be seen from FIG. 6, is approximately equal to the size of the spot. Should the objects continue to move closer together, the individual echoes begin to merge with one another making the determination of two distinct echoes ambiguous. It should be noted however that the ability to detect small changes in amplitude of the returned signal will improve the lateral resolution of the system. Many systems often provide an adjustment on the overall receiver gain and/or sensitivity in order to be able to adjust the system's resolving power.

Figure 7:
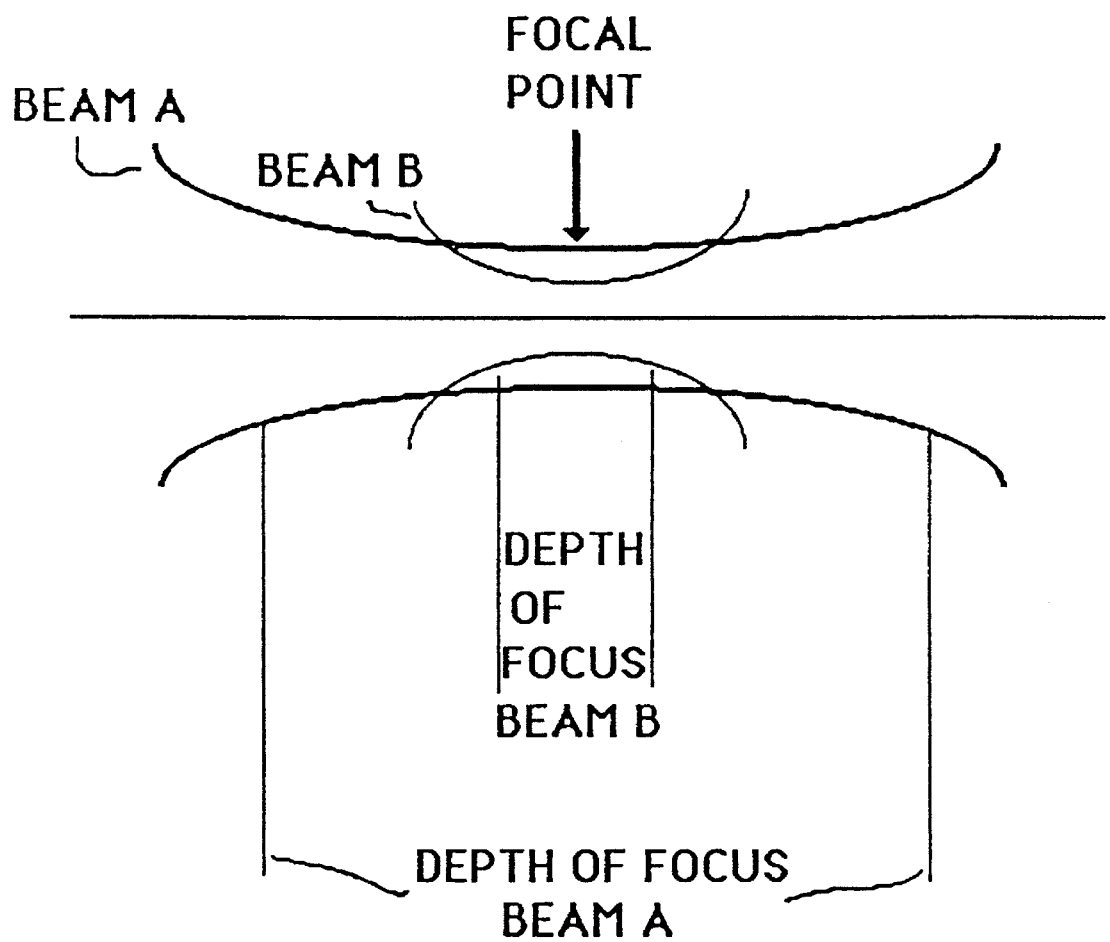
FIG. 7 is a diagrammatic view illustrating depth of focus for two different ultrasonic transducers.

Naturally, in order to maintain the maximum level resolving capability, the spot size must be kept to a minimum for reasons previously discussed. The size of the beam is smallest at the focal point of the transducer. Therefore, any objects that are to be imaged should reside in a plane located at the focal distance. Often this is difficult to do because of a number of application specific problems. The question then becomes how much larger does the beam get as it moves away from the focal point. Another way of stating this is how deep is the region within which the size of the spot falls within certain limits of is optimum size. The answer to this question is referred to as the depth of focus. The depth of focus is defined as the region surrounding the focal point where the spot size is within 1.414/d of its optimum size 'd'. FIG. 7 shows the depth of focus for two different transducers. Transducer A has an aperture size equal to that of transducer B. Transducer B however has a much shorter focal length than transducer A. This results in a much small spot size at the focal point (thus providing better lateral resolution) but diverges much more rapidly as the distance from the focal point increases. It is easily seen from FIG. 7 that the region in which the spot size is within 1.414/d of it minimum spot size 'd' is much smaller for transducer B than it is for transducer A. Thus, for tightly focused transducers, the spot size of the beam at the focal point is much smaller than for weekly focused transducers but the penalty paid for this is that the depth at which this spot size is able to be held is significantly smaller. Therefore, in applications where several planes of varying depth are needed to be imaged, a weakly focused transducer is desirable assuming the spot size is sufficiently small enough.

In most high lateral resolution applications, the size of the spot generated by the beam from an unfocused piezoelectric element is too large. It is this spot size that directly defines lateral resolution as explained previously. Therefore, to decrease the spot size, a refractive medium (a lens) or a spherical reflector is used in order to converge as much of the beams energy at a specific point in space while, at the same time, minimizing the amount of energy (sidelobes) everywhere else.

The concept behind an acoustical lens is identical to that for optical lenses and is based on Snell's Law $$\frac{\sin 1}{\sin 2} = \frac{c1}{c2} \qquad (8)$$

Figure 8:
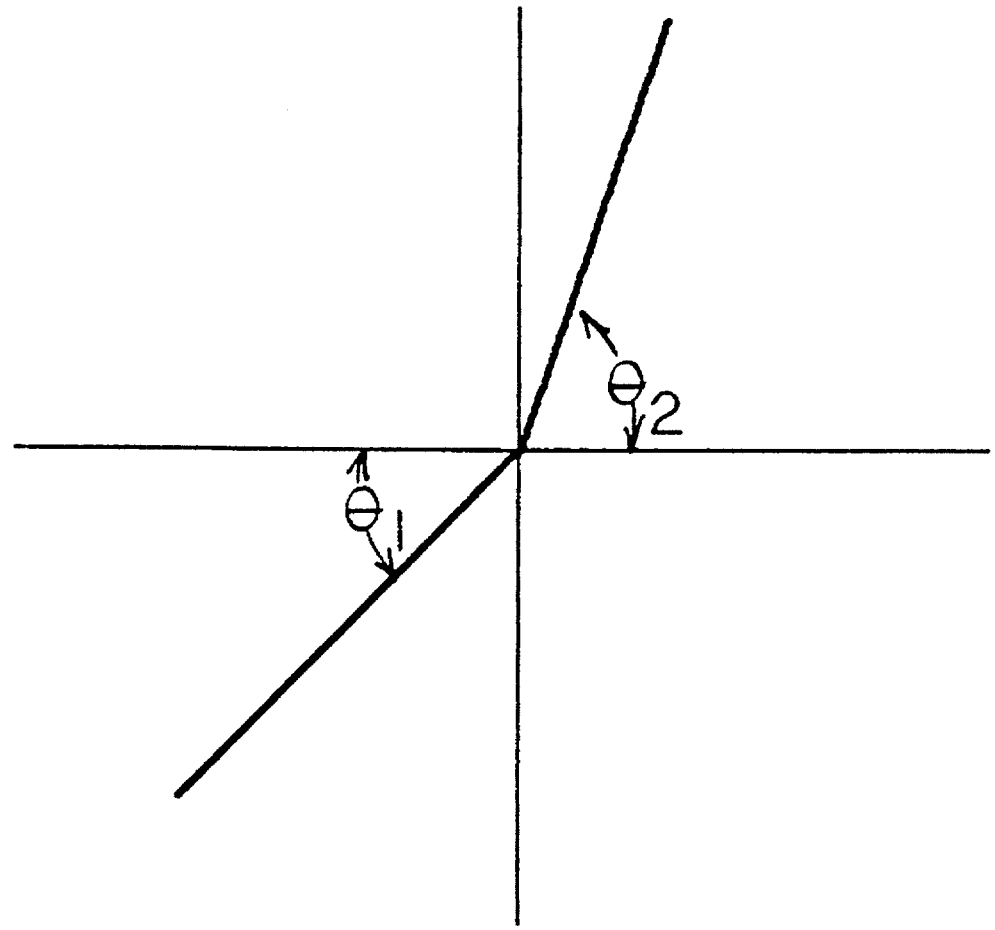
FIG. 8 is a diagrammatic view illustrating Snell's Law for ultrasonic lenses.
Figure 9:
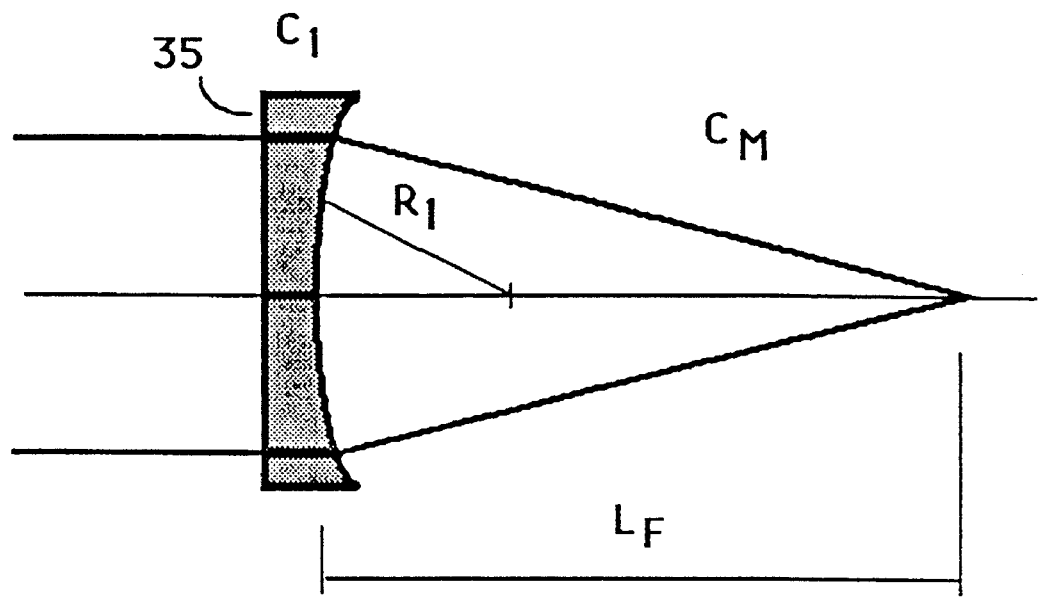
FIG. 9 is a diagrammatic view illustrating a converging ultrasonic lens.

A pictoral explanation of this relationship is given in FIG. 8 and can be stated as the ratio of the sines of the incident ray angle to the transmitted ray angle being equal to the ratio of the phase velocities of the incident medium to the transmit medium. Therefore, by selecting a medium with a phase velocity different from that of its surrounding medium and by shaping the surface of that medium, an acoustic lens can be made. It is similar to that which is done in the case of optical lenses with the most significant difference being the fact that for a positively converging (acoustic) lens, a concave face is needed. This is because the phase velocity of sound in typical lens material such as cross-linked polystyrene, is greater than that of its surrounding medium which is usually water or tissue. Under the constraints that the acoustic phase velocity of the lens material is greater than the surrounding medium, FIG. 9 is a diagram of a converging (positive) lens 35. The focal length of this lens is given by the expression $$l_f = \frac{R1}{1 - (c_m/c_l)} \qquad (9)$$

where R1 is the radius of the concave surface of the lens, $C_m$ is the phase velocity of sound in the surrounding medium and $C_l$ is the phase velocity of sound in the lens material. Using this relationship for focal length and the fact that the radiation pattern from an unfocused circular transducer is essentially a Bessel function of first kind (order 1), then the size (diameter) of the dense central portion of the focused spot from a circular transducer can be calculated as $$d=2.44(l_f/D)(\text{wavelength}) \qquad (10)$$

where D=transducer diameter. The constant 2.44 defines the distance between the first zeroes of the main lobe of the Bessel function. However, this relationship is quite conservative and often the 6 db points are used to define the size of the focused spot. Several instruments provide a manually adjustable gain to allow even more improved lateral resolution at the cost of system SNR (Signal-to-Noise Ratio). The relationship for spot size is often approximated as $$d=(l_f/D)(\text{wavelength}) \qquad (11)$$

As in optics, the ratio of the focal length to the beam diameter is referred to as the 'f' number of the lens. Generally, 'f' numbers less than 1 are considered difficult or too costly to fabricate.

In using lenses for specific applications, an effect known as spherical abberation must be accounted for. In order to fully understand spherical abberation, one need only to look at Snell's relationship along with FIG. 9. It can be seen that for rays far away from the center of the lens, and assuming all rays are parallel to each other and perpendicular to the plane face of the lens, the angle at which the rays strike the spherical face of the lens increases. As the angle increases, the ratio of the sines varies slightly. The variance causes a shift in the focal length which in turn causes an increase in spot size or a smearing effect. The effect of this smearing and whether or not it needs to be corrected for is application specific. However, it is relatively simple to correct for this effect by making the face of the lens elliptical as opposed to spherical.

Another concern in using lenses to focus a beam lies in the inability to image objects that do not reside in the plane of focus. As FIG. 7 shows, the spot size of a beam rapidly diverges on either side of the focal plane. The rate of divergence increases as the focus spot size gets smaller. The axial distance over which the beam maintains its approximate focused size is given by Depth of Focus=$3(l_f/D)^2$(wavelength)

and is referred to as the depth of focus. Therefore, using a tightly focused spot to improve lateral resolution decreases the overall depth of focus. This in turn makes it difficult to apply certain types of electronic processing such as range gates due to the fact that lateral resolution outside the plane focus is severely compromised.

The system of the present invention employs a probe which comprises all those elements other than the interface electronics that are needed to perform a scan. This includes the piezoelectric transducer, the focusing lenses, spinning mirrors, etc. The previous description explained the transducer parameters being tightly coupled to the characteristics of the image to be acquired. The following description will show that the probe architecture is tightly coupled to the application requirements under which the image is to be acquired. Considerations such as speed of acquisition and overall scan area all factor into the type of probe architecture that is chosen. For the purposes of illustration, a variety of different architectures will be described which will enable a clearer understanding of the reasons for providing the particular probe architecture used in the system of the present invention.

Figure 10:
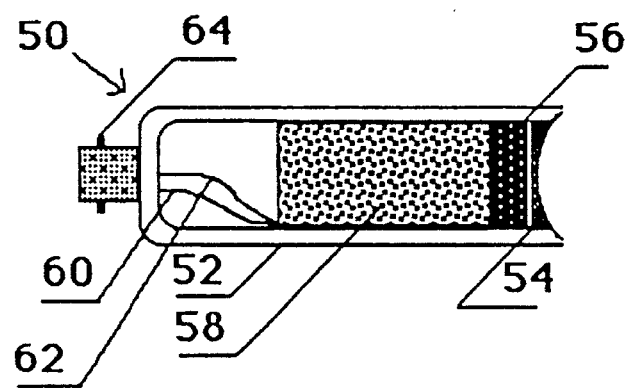
FIG. 10 is a longitudinal sectional view of an ultrasonic transducer used in the system of the present invention.

Probes using a single element piezoelectric crystal for both driving and receiving the acoustic energy are functionally similar to the probe or transducer 50 shown in FIG. 10. In particular, transducer 50 comprises a generally cylindrical housing 52 closed at one end and having an acoustic lens 54 similar to lens 35 of FIG. 9 mounted in the housing at the opposite open end thereof. A piezoelectric crystal 56 is adjacent the planar surface of lens 54, and a body of acoustic absorbing material 58 is in housing 52 and in contact with lens 54. Crystal 56 is connected to external pulsing and receiving circuitry (not shown) via leads 60,62 and an electrical connector 64 on the outer surface of housing 52. Probes of this type generate a fixed focus, non-steerable beam pattern as used to perform an A-mode scan which will be described. In order to achieve other scan geometries using this type of probe, some form of mechanical motion is required. This motion can be either a wobbling or rotating of the crystal, the use of rotating mirrors to deflect the acoustic beam, or physical movement of the entire probe assembly as will be described. Naturally, whenever any type of mechanical movement is introduced into a system, wear factor or mean time between failure becomes an issue. Furthermore, most of the imaging systems that are used for medical scanning are required to be real time (ie. video frame rates). To scan an area of any dimension at these rates using mechanical motion is a difficult task and usually involves high speed, high performance miniature motors. These motors which are responsible for creating the mechanical movement needed to perform the scan also generate a fair amount of vibration and noise which may or may not be a problem in certain applications.

The most important advantage of the single element probe architecture is the simplicity of the pulse/receiver electronics. Since there is only a single element to interface to, only one copy of the pulser/receiver electronics is required. This is in contrast to the multielement probes which could easily have up to 100 or more elements resulting in costly interface electronics.

The type of image to be acquired and the nature of image information needed will determine the proper scan geometry to be used. In many instances, the differences between the individual geometries are subtle, while in other cases the differences are quite significant. The probe architecture and scan geometry are somewhat correlated. Therefore, the type of scan required will most probably influence the choice of probe architectures to be used.

Turning now to various types of scans, in A-mode or amplitude-mode of operation a single element probe is excited with a very short electrical pulse. This pulse causes the low Q transducer to vibrate for a short period of time thus radiating acoustic energy into the sample to be imaged. As the sound wave reaches an interface with a different acoustic impedance, a portion of the signal is reflected back towards the transducer while a portion continues onward. Each time the sound wave strikes a new interface, part of the signal is returned and part continues to propagate forward.

After the initial transmit pulse has been applied to the transducer, the interface electronics are then switched into receive mode. The amplitude of the echoes returned from the various interfaces are then displayed against a horizontal axis representing time. Observing the total elapsed time of the individual echoes (and dividing by 2 to compensate for round trip propagation delays), the depth of the particular interface can be determined. Often an A-mode scan is run prior to trying to obtain an image using a B-scan or C-scan. The depth information returned from the A-scan can be used to set up appropriate range gates, alter focal length in the case of dynamically focused systems, or vary the gain of the receiver at the appropriate time thus emphasizing the region of interest.

B-mode or brightness mode scanning can be thought of as multiple A-Scans placed side by side where the amplitude axis of the A-scan is now displayed as a brightness value or grey scale on the CRT. The scan head is usually (but not always) held in a fixed position and a sector is swept out and displayed on the CRT. The image displayed is a sector whose structures vary in depth from the most shallow structures to the deepest structures. This results in a cross-sectional view of the region being scanned.

This mode of imaging is widely used in the medical community. Often, however, the reflections from structures in the body result in reflections that are somewhat specular in nature. As a result, if this structure does not lie at an angle close to perpendicular to the propagation path of the beam, the reflection will be missed by the transducer. It is therefore often quite advantageous to view a structure from several directions in order to create a composite image of the structure. This is accomplished by fixing a mechanical sensing system onto the arm of the B-scan head. The positioning system keeps track of where it is in relationship to the patient's body and feeds this information back to the computer. This allows multiple images to be acquired from a variety of angles and properly reconstruct the image internal to the computer resulting in a much higher definition image. This type of B-scan is referred to as compound B-scan.

There are two distinctively different definitions of C-mode ultrasonography. The medical community generally refers to this type of imaging as through-transmission. Two transducers are used in a pitch-catch configuration. Since there is usually no clinical information to be obtained from a C-mode scan, the medical community rarely uses this type of scan geometry.

Another and more widely accepted definition of C-mode ultrasonography, as used in the non-destructive test industry, is a parallel beam propagation used to capture an image along a plane perpendicular to the propagation path of the ultrasound. The entire image that is created lies in a place at a constant distance from the transducer. As a result, the scan geometry can be easily optimized so that the image plane resides at the focal point of the transducer thereby producing the best possible image with respect to lateral resolution.

A C-mode scan can be performed by collimating the rays of a B-mode scan, performing range gating on the B-mode scan to look at a particular depth, and stacking several B-mode scans together to generate the desired two-dimensional image.

Figure 11:
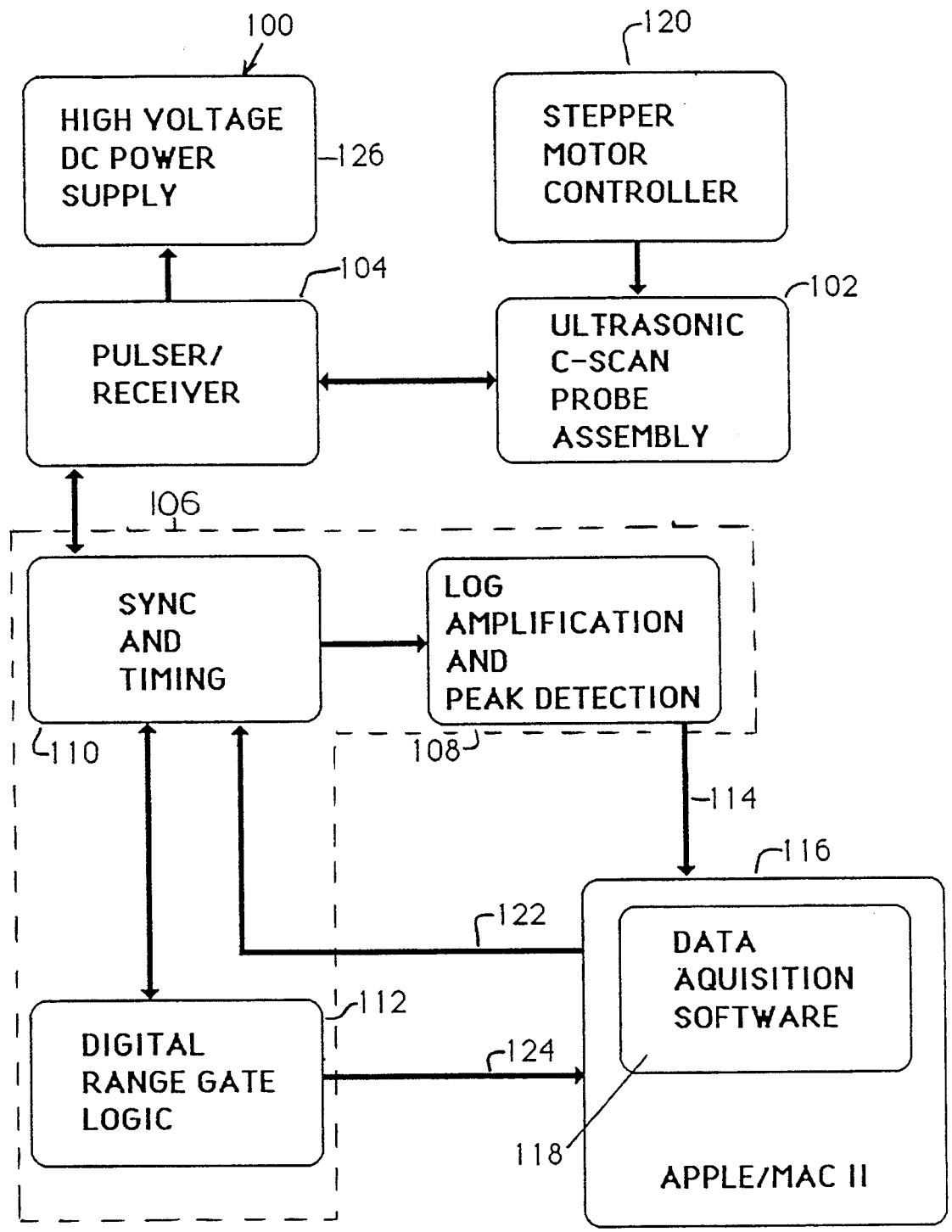
FIG. 11 is a block diagram of the ultrasonic imaging system according to the present invention.

FIG. 11 illustrates the system 100 according to the present invention. System 100 performs a C-scan over a fixed area, for example 0.500"×0.750", and applies range gating on this area anywhere from the surface down to a given depth, for example 5 millimeters. This scan geometry is accomplished by essentially performing a collimated B-scan with range gating and then stacking the output of multiple range gated B-scans together to obtain a C-scan geometry and the desired image. One of the principal components of system 100 is a probe 102 which, in turn, includes a fixed focus, 30 Mhz transducer used to create a spot size of approximately 0.006" in diameter which defines the lateral resolution limit as previously described. Probe 102 will be described in detail presently. This spot is reflected off an acoustic mirror in probe 102 towards the object to be imaged. The mirror is attached to a rotating motor which provides a constant scan speed. As the mirror rotates, the spot is swept across the object in a sector like fashion. In order to eliminate the varying depths of focus caused by a sector scan, probe 102 also includes a lens to collimate the beam. Accordingly, as the acoustic mirror is rotated by the object to be scanned, a linear scan line is generated in which range gating can be applied. Once an entire line has been scanned, the transducer and mirror assembly motor is stepped by 0.006" using linear actuator to prepare for the next scan line. This entire process is repeated until an area equal to 0.500"×0.750" has been scanned. The detailed structure and operation of probe 102 will be described presently.

System 100 further comprises a pulser/receiver 104 operatively connected to probe 102. The data returned from the ultrasonic transducer is amplified by pulser/receiver 104 and passed to high speed signal processing means generally designated 106. By way of example, pulser/receiver 104 has a bandwidth of 40 Mhz and is able to amplify the returned data signals by 40 db. Signal processing means 106 includes a log amplification and peak detection circuit portion 108, a synchronizing and timing circuit portion 110 and a digital range gate logic circuit portion 112, all of which will be described. The output of the high speed signal processing circuitry 106 is transmitted along path 114 as 8 bits of digital data and stored internal to computer 116 where it can be displayed on a 256 grey scale monochrome monitor or stored on disk for viewing at a later time. Computer 116 is not only responsible for collecting, storing, and displaying the data, but also controls the entire data acquisition process via the execution of control software 118. This software is responsible for initializing/controlling the hardware 110, issuing step commands to a stepper motor controller 120 associated with probe 102, and providing the necessary user interface to initiate the entire scan process. Signals containing digital status and control information are transmitted between computer 112 and signal processing means 106 via path 122 and 124. A high voltage d.c. power supply 126 is associated with pulser/receiver 104.

It is apparent that the step size along one axis of scan motion, i.e. the 'x' axis, is directly controlled by the size and number of steps that are delivered by the stepper motor of the linear actuator in the probe. Furthermore, since the commands to cause a step are generated by the software running on computer 116, there is no problem in determining what the linear actuator stepper motor is currently doing since it is under complete control of the software. Determining the position of the rotating acoustic mirror in probe 102 also is straightforward since it too is controlled by software.

Figure 12:
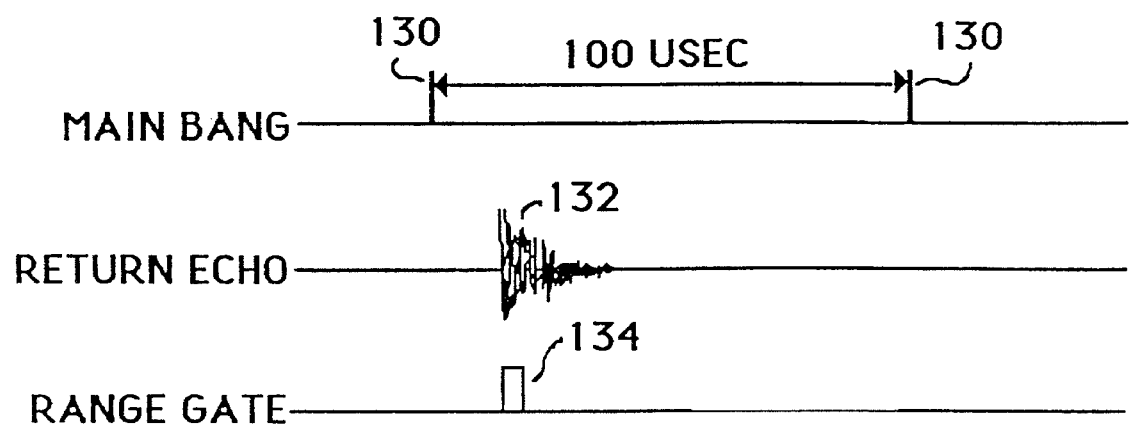
FIG. 12 is a graph including waveforms illustrating operation of the system of FIG. 11.

Once the position of the rotating mirror of probe 102 has been determined, the pulse repetition frequency of pulser/receiver 104 can be adjusted to provide the required step size in the other axis of scan motion, i.e. the 'y' axis. This step size is determined by the amount of rotation the acoustic mirror of probe 102 moves between the main bang pulses of pulser/receiver 104. By way of example, for a 600 rpm rotation rate and knowing the distance that the acoustic mirror is spaced from the collimating lens (the focal length), to sweep out a distance of 0.006" per pixel requires 100 microseconds of rotation. Thus, the pulse repetition frequency or PRF of the pulser/receiver must be set to 10 Khz. FIG. 12 shows this PRF timing including the main bang pulses 130 of pulser/receiver 104, the return echo 132 and the range gate pulse 134.

Figure 13:
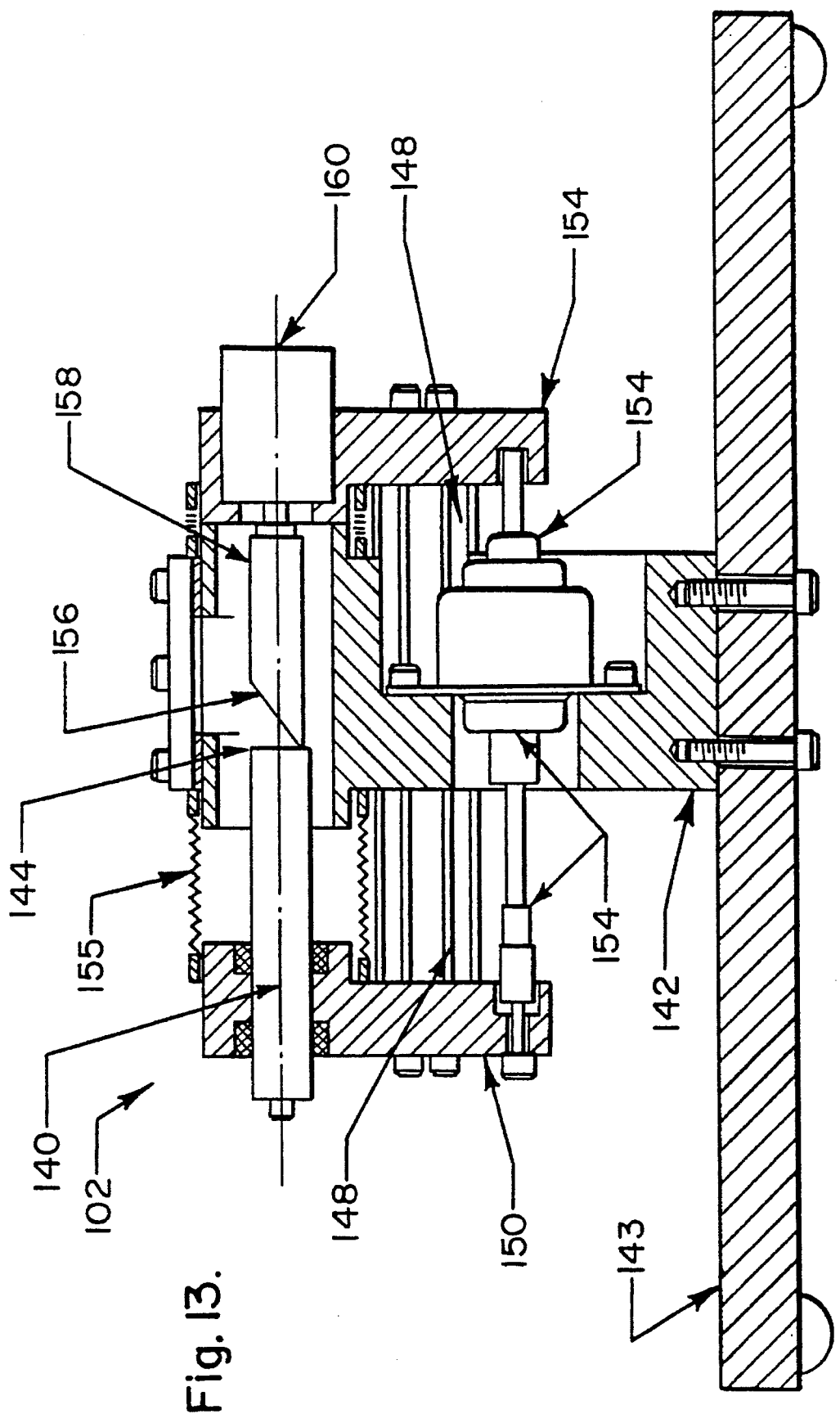
FIG. 13 is a longitudinal sectional view of the probe of the system of FIG. 11.
Figure 14:
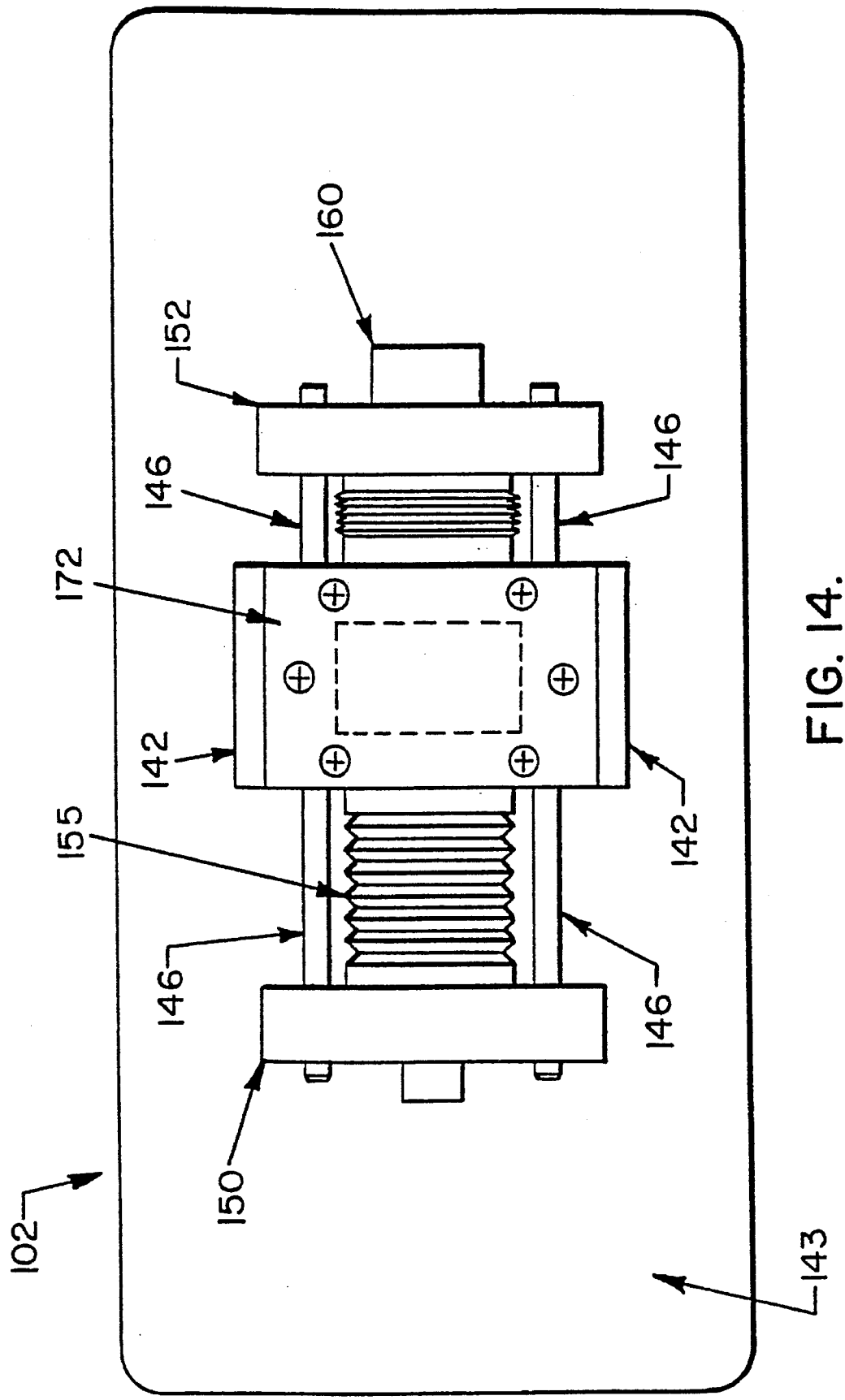
FIG. 14 is a top plan view of the probe of FIG. 13.

Probe 102 is shown in further detail in FIGS. 13 and 14 and includes a single 30 Mhz, fixed focus transducer 140 mounted internal to an overall housing 142 which is fixed to a base 143. Housing 142 includes a cavity or chamber 144 filled with water and fixed in space. Transducer 140 is carried by a linear slide rail assembly comprising guide bars 146, side rails 148 and brackets 150 and 152 which is controlled by a linear actuator 154 comprising a stepper motor and a ball screw as is well known to those skilled in the art. In particular, transducer 140 is mounted in bracket 150. This allows the transducer 140 to be moved in both directions along one axis of scan motion. This axis of motion will be referred to as the 'x' axis. A flexible bellows 156 is open to cavity 144 and sealingly connected to housing 142 and bracket 150. The second axis of scan motion, the 'y' axis, is achieved by a rotating acoustic mirror 156 that also resides internal to the probe housing 142 and is fixed in space with respect to the ultrasonic transducer. The mirror 156 is mounted on the end of a shaft 158 rotatably mounted in housing 142 and driven by a stepper motor 160 carried by bracket 152. Motor 160 and transducer 140 are moved together linearly along the 'x' axis. Thus, as the transducer 140 moves along the one axis of the probe housing 142, the acoustic mirror 156 also rotates at a rate of 600 RPM. This rotation causes the ultrasonic beam to be deflected off axis according to the present position of the acoustic mirror. The net effect is that a second scan motion, orthogonal to the motion caused by the linear actuator 154, is created. Therefore, to create a two dimensional scan image, the data being returned along the 'y' axis as a result of the rotating acoustic mirror 156 is collected and stored for a single scan line. Once this scan line is complete, computer 116 issues a command to a controller (not shown) for linear actuator 154 to step to the next scan line in the x-axis. After the step has been performed, computer 116 begins collecting data from a second scan line in the y-axis. This process repeats for the entire scan image.

By way of example, in an illustrative system transducer 140 is a single element, 30 MHz, fixed focus transducer having a structural arrangement similar to that shown in FIG. 10. The aperture size of the transducer is 5/16" with a focal length of 0.750". This yields an 'f' number of approximately 2.4. A lens is used to focus the beam at the focal length of 0.750". This results in a very tight spot at the focal point of about 0.006" (measured at the −6 db points). It is this spot size that determines the lateral resolution limit. In addition to high lateral resolution, good axial resolution is also required for accurate range gating. The Q of the transducer must therefore also be kept very low. This particular transducer has a Q of 2.

By way of example, in an illustrative system, linear actuator 154 is available commercially from Haydon Switch & Instrument Inc. under the designation Series 35800 and stepper motor 160 is commercially available from Vernitech under the designation 90 Stepper Motor 08NPD-AA4-A1.

The rotating acoustic mirror 156 is used to sweep out a single scan line in the y-axis. The returned data is then range gated and stored as a single scan line in the overall image. By way of example, in an illustrative system, plate glass pitched at a 52° angle is used as the acoustic mirror 156. There are several factors that influence the selection of the type of mirror material, its thickness, and the angle at which to place it. First and foremost, the probe architecture constitutes the requirement for deflecting the beam at right angles (or near right angles) to its original propagation path. Thus, the reflecting surface must be pitched at or about 45° with respect to the original path of propagation. Secondly, in order to maximize the amount of reflected compressional wave from the surface of the mirror 156 the amount of compressional wave that is transmitted into the glass must be minimized. In order to do this, the incident wave must strike the surface of the mirror 156 at the critical angle in order for mode conversion (from compressional to shear) to take place. It is always desirable to operate slightly beyond the critical angle in order to ensure complete conversion. Therefore, a material must be selected having phase velocity and acoustic impedance such that mode conversion occurs at an angle slightly less than 45°. Ordinary plate glass has such a critical angle when placed in water. As a rule of thumb, the thickness of the reflecting material should be at least 2–3 wavelengths to ensure that the material does not vibrate but reflects the beam.

Using an acoustic mirror angled at 45° results in propagation paths orthogonal to the walls of the collimating lens as well as the walls of the probe body itself. These walls create reflections themselves and furthermore, the reflections occurring from the lens may cause artifacts to appear at the depth of the desired range gate. Therefore, to eliminate these artifacts, the mirror 156 is pitched an additional 7°. Since the walls of the lens are specular reflectors, the reflected signal is now angled sufficiently away from the acoustic mirror so as to miss it altogether. As a result, no unwanted reflections from any of the surfaces of the probe appear thus eliminating the potential for any artifacts to occur. This naturally, however, results in a major difference with respect to the type of object that can be scanned. Specifically those objects that appear as specular reflectors result in returns that are missed by the acoustic mirror 156. Only objects that appear as a scatterer, that is return the signal in all directions, are able to be imaged. Should specular images be desired, then the 52 mirror can be replaced by a 45 mirror.

Figure 15:
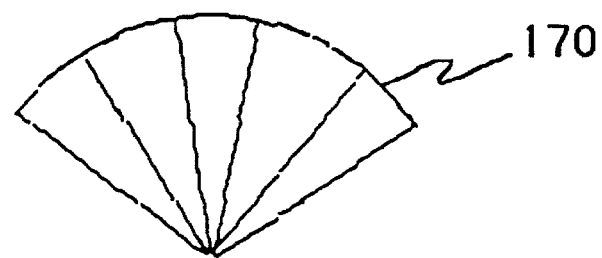
FIG. 15 is a diagrammatic view illustrating a sector scan swept by the acoustic mirror in the probe of FIGS. 13 and 14.
Figure 16:
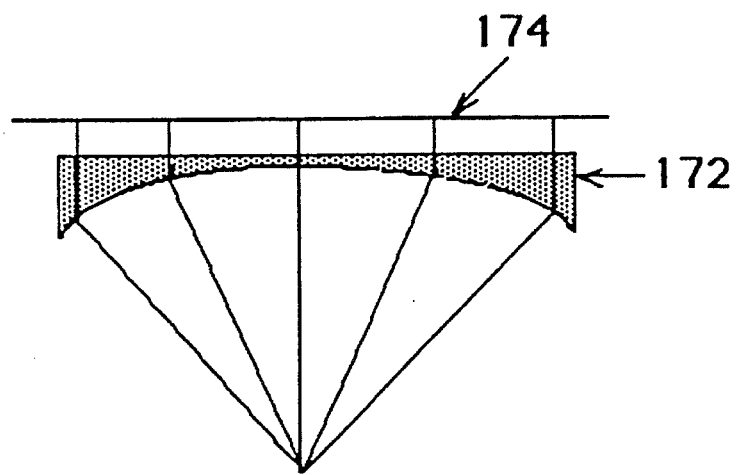
FIG. 16 is a diagrammatic view illustrating a relationship between the acoustic mirror and lens in the probe of FIGS. 13 and 14.

The rotating acoustic mirror 156 is responsible for sweeping out a sector scan along the y-axis. The characteristic of a sector scan is a spherical field of focus in the longitudinal plane. That is, without any correction from external lenses, the distance to the focal point at the edge of a sector is different than the distance to the focal point at the center of the sector when measured from the object being imaged. FIG. 15 shows the geometry of the field of focus 170 for an uncorrected sector scan. Since lateral resolution is of the utmost importance for this particular application, it is essential that the object being scanned be in focus for the entire scan area since it is at this distance that spot size is held to a minimum. This is compounded by the fact that depth of focus is very shallow due to the tight focusing employed to reduce the spot size. Therefore, to alleviate this problem a plano-concave lens designated 172 in FIGS. 13 and 14 is added between the rotating acoustic mirror 156 and the object, such as a finger, to be imaged. One function of the lens is that it collimates the beam. The characteristic fan geometry of the sector scan is converted to the parallel geometry associated with C-scans. The result is that on the far side of the lens 172 a single plane 174 exists in which the focal point of the transducer resides as shown in the diagrammatic view of FIG. 16. This plane can be varied in its position along the longitudinal 'z' axis accordingly by repositioning the transducer with respect to the rotating mirror 156. Therefore, sub-surface scans can be optimized with respect to lateral resolution by moving transducer 140 closer to the rotating mirror 156 thereby moving the focal point of the transducer deeper into the structure being scanned. However, deeper scans can also be obtained by simply changing the electronic range gate without any probe adjustment at all. This is provided that the effects of the depth of focus are tolerable, i.e. increased spot size.

A second function of lens 172 is to provide a natural interface for the object being imaged (the finger) to be placed upon. If the collimating lens were not there, some other form of interface would have to be provided in order to support the finger being imaged. Lens 172 not only steadies the finger while it is being scanned, but also tends to flatten the finger out on the edges, thus creating a larger plane to be imaged.

A number of materials can be used as the material for lens 172. However, in order to maximize the quality of the image, a material having acoustic impedance closely matched to that of the skin is highly desirable. This causes the ultrasound on the ridges to be absorbed reasonably well while the ultrasound at the valleys (air) is reflected almost completely. Yet, the material selected must still exhibit an adequate phase velocity difference from water such that the physical size of the lens is reasonable. Cross-linked polystyrene appears to be a very good choice for lens material when imaging the body. Its acoustic impedance and phase velocities are not only suitable for this type of application, but it also is a readily available, easy to work with, and an inexpensive material.

Figure 17:
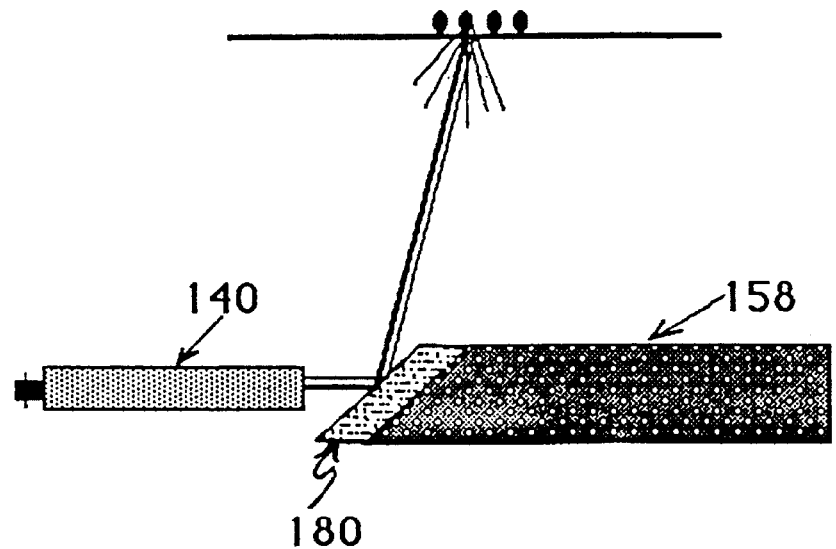
FIG. 17 is a diagrammatic view of a ray trace of the ultrasonic beam from the probe of FIGS. 13 and 14 as the beam strikes a scatter reflector.
Figure 18:
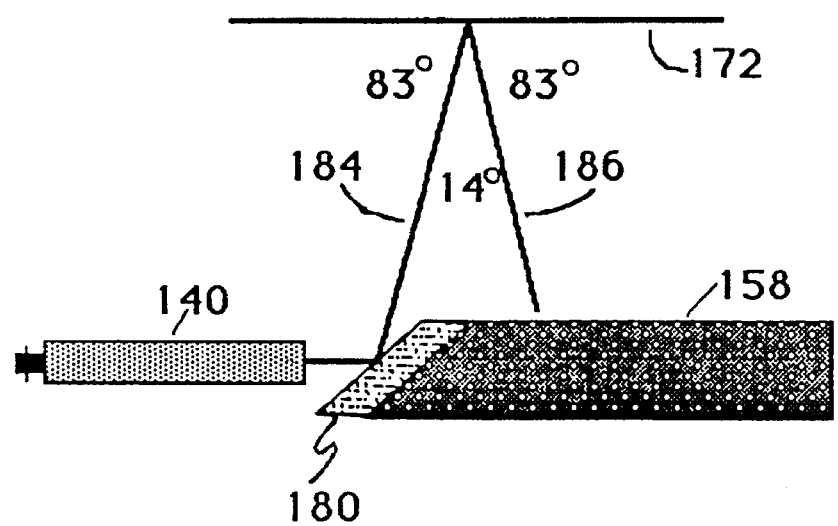
FIG. 18 is a diagrammatic view of a ray trace of the ultrasonic beam from the probe of FIGS. 13 and 14 as the beam strikes a specular reflector.
Figure 19:
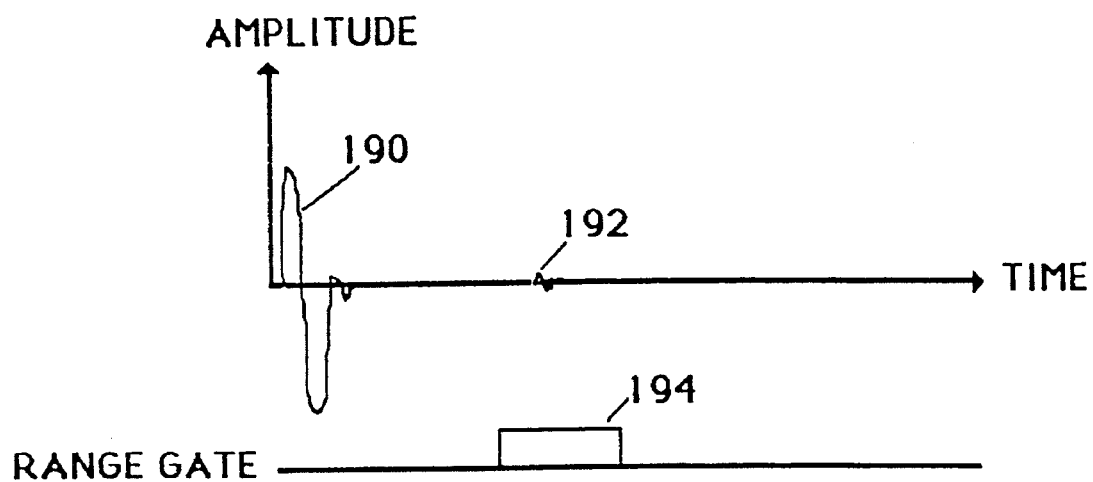
FIG. 19 is a diagrammatic view illustrating ultrasonic return pulses seen by the transducer in the probe of FIGS. 13 and 14 when echoing a specular reflector.

FIGS. 17 and 18 provide a ray trace of the ultrasonic beam as it strikes a scatter reflector and specular reflector respectively. Acoustic mirror 156 is on the end of shaft 158 driven by motor 160 of FIGS. 13 and 14. As shown in FIG. 19, the angle of the incoming incident ray 184 is sufficient enough so as to cause the specular return to miss rotating acoustic mirror 156, thereby never returning it back to transducer 140. As previously described, the incident angle of the ultrasonic ray upon collimating lens 172 is created by the pitch of acoustic mirror 156 (which is 7° beyond normal). Performing some simple geometric calculations shows that the reflected beam 186 does indeed miss acoustic mirror 156, thereby not allowing any energy to be returned to transducer 140. FIG. 19 shows a typical ultrasonic return as seen by transducer 140 when echoing a specular reflector i.e. an object such as a fingerprint. In particular, the main bang pulse from pulser 104 is designated 190, the return echo pulse is designated 192 and the range gate pulse is shown at 194. The output of transducer 140 eventually gets digitized and sent back to computer 116 for display. Since the return amplitude 192 is essentially zero, the corresponding grey scale value will also be zero. This results in a black or dark region on the monitor. The valleys of the fingerprint are essentially air and therefore the plastic-air interface causes a specular return. Since specular returns are displayed as dark regions, the valleys of the fingerprint will also be displayed as dark regions.

Figure 20:
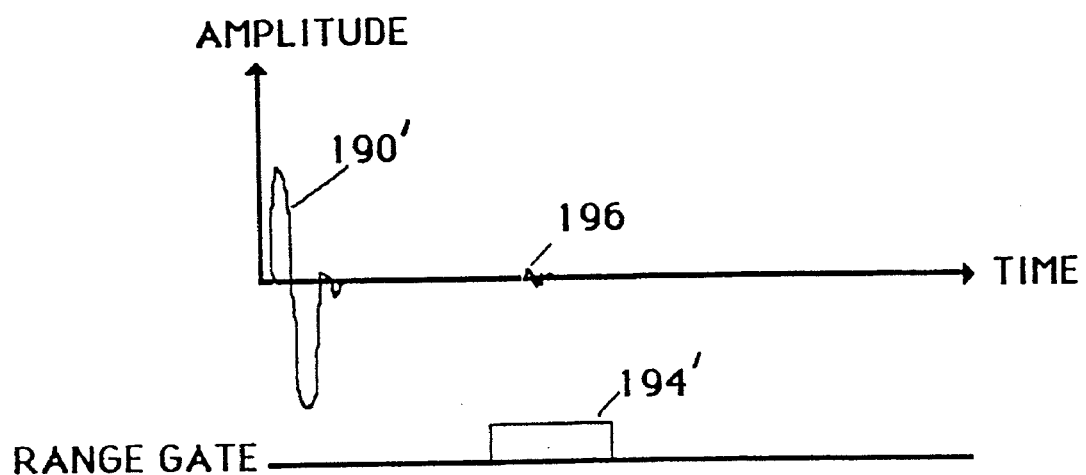
FIG. 20 is a diagrammatic view illustrating ultrasonic return pulses seen by the transducer in the probe of FIGS. 13 and 14 when echoing a scatter reflector.

The ridges of the finger appear as ultrasonic scatterers. That is, the ultrasonic energy is reflected back in all directions. Provided that some of the rays are reflected back at a angle which compensates for the incident angle (7°), the return echoes will be seen by transducer 140, thus resulting in a return 196 similar to that shown in FIG. 20. This relatively large amplitude return 196 eventually is passed to computer 116 as a large grey scale value which in turn is displayed as a white or very light region on the monitor. Therefore, all ridges of the fingerprint are displayed as very light or bright regions. Once the basic image has been captured internal to computer 116, should an inversion of the image be desired, i.e. all valleys appear as bright regions while all ridges appear as dark regions, it is quite straightforward to perform this inversion in software.

An important observation can be made in the case of the scatter return. Since by definition the scatter reflector causes energy to be returned at all angles, an equal amount of energy is capable of being collected at various distances away from collimating lens 172. These varying distances are simply the focal points of the lens for return echoes of different angles. This characteristic is an important one from the point of view of fabricating the probe assembly. First, it allows for the placement of rotating acoustic mirror 156 to be non-critical, since an equal amount of energy is capable of being collected at any distance. Secondly, the quality of collimating lens 172 also becomes non-exacting. Specifically, the effects of spherical abberation are no longer an issue thus allowing a spherical lens to be fabricated.

Figure 21:
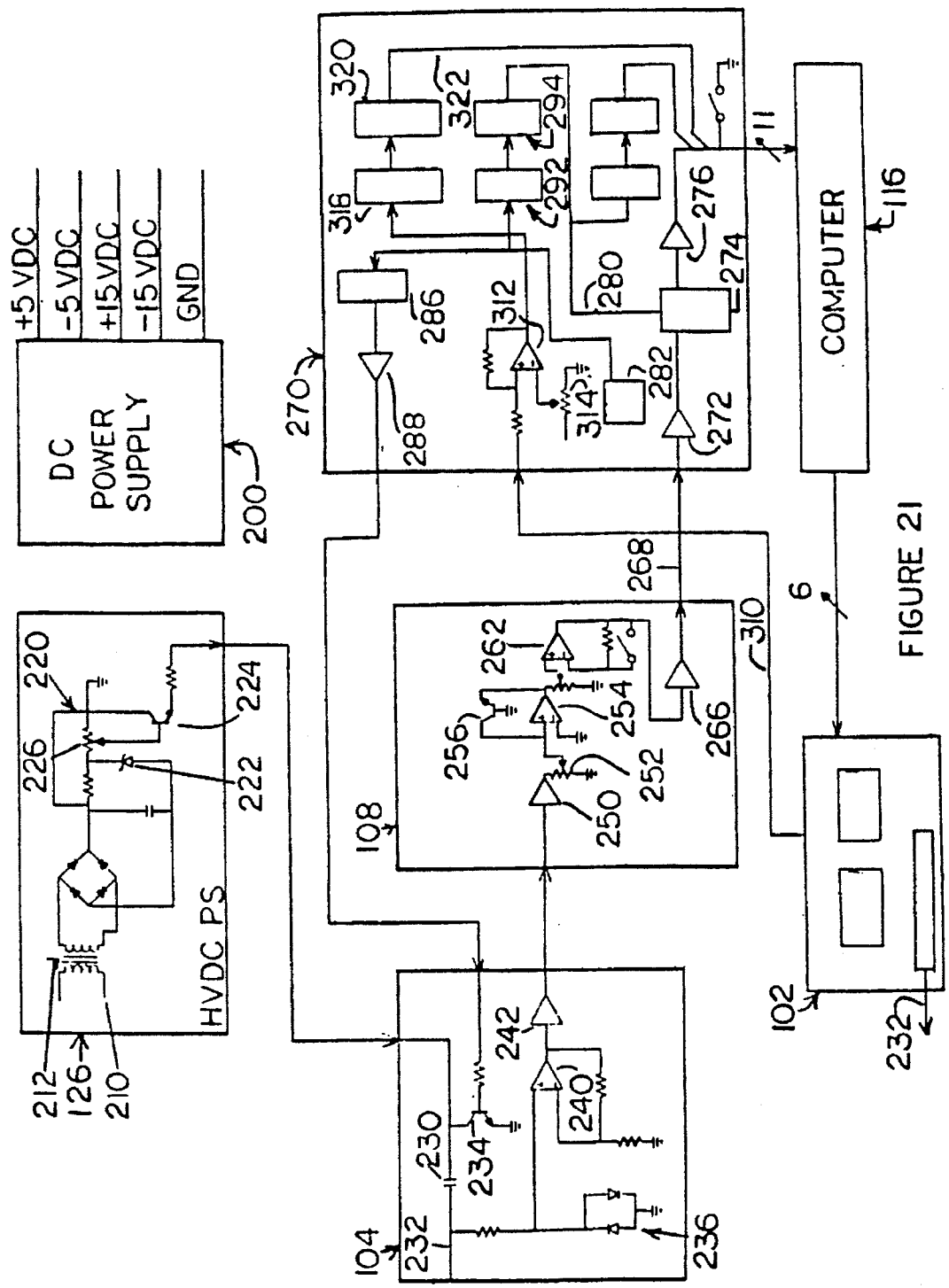
FIG. 21 is a schematic diagram of a circuit for implementing the system of FIG. 11.

FIG. 21 illustrates a preferred form of circuit for implementing the system of FIG. 11. Power is provided to all of the subassemblies of the system using an off-the-shelf DC power supply 200. This supply provides four rail voltages +5, -5, +15, and -15 which are sent to the appropriate subassemblies. Should voltages other than these be required by any one subassembly, then these voltages are derived on that subassembly from one of the four main rail voltages. The four rails, +5, -5, +15, and -15, are capable of supplying 1.5 amps., 1.5 amps, 0.8 amps and 0.8 amps respectively.

The high voltage DC power supply 126 is for driving the piezoelectric oscillator in transducer 140. A 115 VAC input 210 is applied to the primary of a 1:2 turns ratio transformer 212 in order to double the AC voltage output. The secondary of transformer 212 is connected to a full wave rectifier 214, the output of which is passed through a voltage doubler circuit including capacitor 218. The output of the voltage doubler 218 is applied to a series regulator 220, the control of which is provided by a zener diode 222 establishing a reference voltage to the base of a series pass transistor 224. The zener voltage is first passed through a potentiometer 226 to allow the high voltage output to be variable from 50 to 300 VDC. This output is used by the pulser/pre-amp 104 to charge a capacitor used to drive the transducer 140.

The pulser/pre-amp 104 is responsible for sending driving signals to and receiving signals from the transducer 140, amplifying the received signals, and passing the amplified signals to the log receiver 108. A capacitor 230 in the pulser/pre-amp subassembly 104, which is connected to transducer 140 via line 232, is initially charged to full value by the HVDC supply 126. The charged capacitor is rapidly discharged into the piezoelectric crystal of transducer 140 by means of a high speed avalance transistor 234. In particular, switching of transistor 234 reverses the polarity of voltage on capacitor 230 thereby applying a negative spike or discharge pulse to transducer 140. Falling edges of 0.8 nanoseconds over a 300 VDC range are obtainable. The high transmit voltage spike is suppressed by a transmit/receive switch 236 comprising two back-to-back diodes. This switch limits the high (300 VDC) voltage spike due to the transmit pulse from reaching the preamplifier and thus damaging it. The low level ultrasonic returns are passed umimpeded and are amplified by the preamplifier comprising a high input impedance FET amplifier 240. This amplifier provide approximately 40 db of linear gain to the signal which is then buffered by a line driver 242 and sent to the log receiver subassembly 108.

The log receiver subassembly 108 includes an input amplifier 250 which buffers the input signal from the pulser/pre-amp 104, and a potentiometer 252 provides a variable attenuation in order to bring the signal into the proper range of the log amplifier. The log amplifier comprises the combination of operational amplifier 254 and feedback transistor 256. The signal is logarithmically amplified therein by 60 db and again passed to a variable attenuator in the form of potentiometer 260. Attenuator 260 is used to scale the output of the log amplifier which is then sent to a video amplifier 262 for final scaling. The output of the video amplifier is a signal that swings between +2 vdc and −2 vdc which is the scaling that is required by the peak detector circuitry in the A/D convertor subassembly 270.

The A/D convertor subassembly 270 is responsible for providing peak detection on the output signal of the log receiver subassembly 108 as well as generating all of the necessary timing for issuing main bang pulses and performing range gating. The output of the log receiver is passed through a buffer 272 and sent to a peak detector circuit 274. This circuit 274 is capable of detecting a peak of 10 nanoseconds in duration with an amplitude of only 7 millivolts, and circuit 274 can be implemented by various arrangements well known to those skilled in the art. For example, in an illustrative circuit peak detector 274 is commercially available from TRW LSI Products Inc. under the designation Monolithic Peak Digitizer TDC1035. The output of peak detector circuit 274 is 8 bit digital data which passes through a TTL line driver 276 and is sent to comparator 116 for reading. By way of example, in an illustrative system, computer 116 is an Apple MAC II. A timing pulse is applied via line 280 to the peak detection circuit 274 to define the range gate. All of the timing is initiated from a free running 555 timer 282. The output of timer 282 is responsible for the generation of three other timing pulses as follows.

The first timing pulse is the main bang pulse used to by the pulser/pre-amp subassembly 104 to discharge capacitor 230 into the transducer 140. The timing pulse from timer 282 is adjusted in width using a one shot 286. The output of one shot 286 is then sent to a 50 ohm line driver 288 and driven at a 15 volt level where it is received by the pulser/pre-amp 104.

The second timing pulse is the generation of the range gate used by the peak detector circuit 274. This pulse is formed by a series of one shots. The first one shot 292 adjusts the total delay of the range gate with respect to the main bang pulse, while the second one shot 294 determines the pulse width or width of the actual range gate. Thus, by adjusting these two one shots, the depth and size of the range gate can be adjusted. Typically, delays of approximately 20 microseconds and widths of about 1 microsecond are employed.

The third timing pulse is the generation of the data available pulse used by computer 116 to indicate that the data on the output of the peak detector 274 is in fact valid data. This pulse is initiated by the trailing edge of the range gate pulse on line 280 (which is initiated by the main bang pulse) and then delayed an appropriate amount through the use of one shot 296. The width of this delayed signal is then altered using a second one shot 298. It is the signal which is sent to a TTL buffer (not shown) and passed on to computer 116 as a DATA AVAILABLE pulse.

The computer 116 is essentially waiting for the issuance of a DATA AVAILABLE pulse by the hardware. Once it detects the pulse, it reads the data present on the output of the peak detector 274 and stores it. This process is described in more detail further on as well as the control of the overall probe assembly 102.

In order to collect data echoed from the object being imaged as opposed to random returns that may be echoed from the probe body itself, it is necessary to provide computer 116 with information on the rotational position of acoustic mirror 156. The data acquisition process must occur during the interval when mirror 156 is facing collimating lens 172, i.e. facing the object being imaged. In order to determine when this interval is occurring, the position of motor shaft 158 and therefore acoustic mirror 156 must be determined. This is accomplished by providing an encoder arrangement (not shown) associated with motor shaft 158 for providing information signals for use by computer 116.

In particular, a marker (not shown) such as a small piece of black material is placed on motor shaft 158 at a known angular position relative to the rotation of shaft 158 and the angular position of mirror 156. A combination infrared light-emitting diode and photodetector (not shown) is positioned so as to generate an output pulse each time the marker is in the field of view of the photodetector, which occurs once per rotation of shaft 158. The foregoing is typical of encoder arrangements well known to those skilled in the art.

The encoder output signal is transmitted from probe 102 via line 310 to one input of a comparator 312 in A/D converter 270. Potentiometer 314 is connected to the other input of comparator to establish a threshold. As a result, only signals above the pre-set threshold will be passed by comparator 312 in a known manner so as to distinguish the photodetector output from spurious signals. The output of comparator 312 thus is a synchronization pulse which indicates the position of mirror 156. A digital time delay is added by one shot 318 to mark when mirror 156 is at the beginning of its scan of the collimating lens 172. The width of the delayed pulse is altered by one shot 320 and the resulting signal is sent to computer 116 via line 322.

Figure 22:
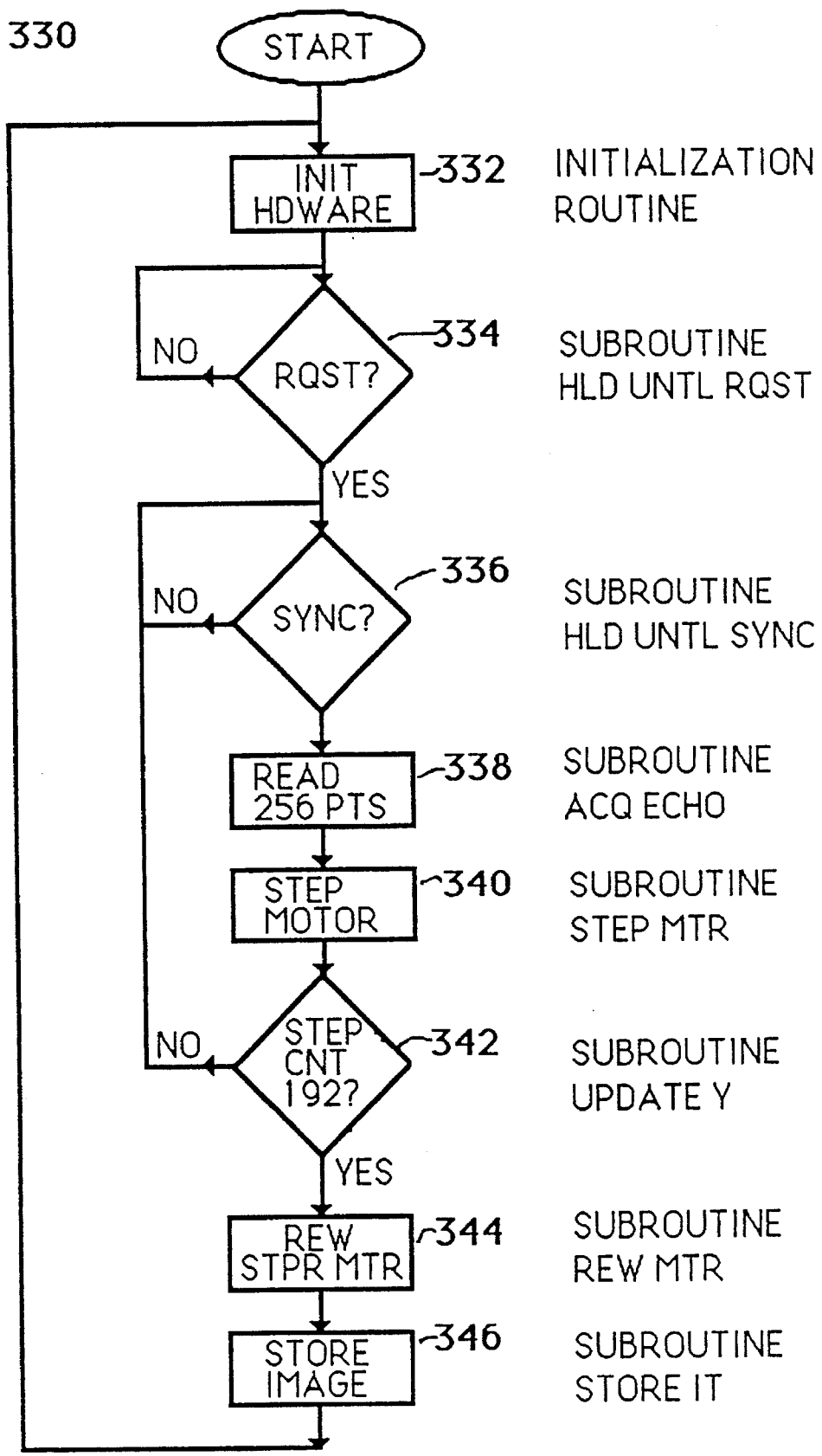
FIG. 22 is a program flow chart illustrating the software for controlling operation of the computer in the system of FIG. 11.

The software designated 330 in FIG. 22 controls the data acquisition process on the subsystem of computer 116. The software is responsible for interfacing and controlling the parallel digital I/O ports found on the data acquisition board of computer 116. It is entirely through the data acquisition board that computer 116 communicates with the signal processing means 106. The software 330 initializes the hardware when required and keeps track of where the data acquisition process is with respect to the entire run in order to control the stepper motor step function and direction appropriately. Therefore, the software needs only to execute at 'moderate' throughput rates in order to keep up with the required processing tasks. The programing language BASIC was chosen for the language in which to implement the system. The compiled code for this language provided more than enough processing power to handle the tasks fast enough and yet was a simple and easy language to write and debug thereby enabling fast and accurate coding to take place. A flowchart of the overall programmatic flow is given in FIG. 22 and the detailed code is presented in the attached Appendix. A timing diagram of the overall system activities as defined by the control software is given in FIG. 23.

Referring now to FIG. 22, in the initialization routine 332 the initialization code is involved upon power up or upon restart of a multiple scan. It is this code that is responsible for initializing all program variables as well as hardware parameters found on the data acquisition portion of computer 112.

The main driver routine is responsible for invoking all of the support subroutines at the appropriate time in the appropriate sequence. Furthermore, service oriented questions to the user such as "Do you wish to run another scan", "Do you wish to store the scanned data", or "Enter the file name in which to store the data" are all output as part of this routine. These are the only three responses that the user will have to make in order to run a scan. The first question, "Do you wish to run another scan", is answered either a 'y' for yes or 'n' for no followed by a carriage return. This allows the user the option to either quit the program in an orderly fashion, or continue on to the next stage of processing which is to actually perform a scan.

The second question, "Do you wish to store the scanned data", appears immediately after a scan has been performed. Again this question is answered with either a 'y' for yes or 'n' for no followed by a carriage return. This allows the user the option of creating and storing a file on hard disk with the raw (unprocessed) data. Conversely, there may be certain reasons why the user suspects (or knows) the data to be invalid, therefore not desiring to store it. The response of 'n' will circumvent the storage routine call and return back to the start of the program The third question, "Enter the file name in which to store the data", appears only if the user has responded affirmatively to the second question. If so, a maximum 27 character file name must be entered followed by a carriage return. This is the actual name of the file as it is to be stored onto the hard disk.

After the software and hardware has been initialized, the main routine passes program control to the HldUntlRqst subroutine 334. The purpose of this routine is to wait until the user signifies that a scan should commence now. While the routine is waiting for a request to scan from the user, a "Waiting for Request" message is output onto the CRT. Once a request has been made, control is returned to the main driver routine.

A request to scan can be initiated by either activating an external Request to Scan switch that drives bit '0' of Port 'A' or typing the letter 'R' on the main keyboard. Therefore, this subroutine monitors bit 0 of Port A on the data acquisition board. Should this line go low, or a request be made by the user via typing the letter 'R' on the keyboard, then the subroutine interprets this as a request to scan and returns control back to the main driver for further processing. Bit 0 of Port 'A' is driven low only by an external toggle switch that is mounted on the main electronics assembly and activated by the user when a request to scan is desired. The 'OR'ing of the keyboard response with the external switch is merely for purposes of convenience.

Once a request to scan has been initiated by the user, the software passes control to the HldUntlSync subroutine 336. This routine monitors bit 1 of Port 'A' to determine if a sync pulse as driven by the hardware has occurred. This would then tell the software to prepare for data acquisition. Since the detection of the sync pulse is quite critical and vendor-supplied routines for digital I/O are extremely slow, individual PEEK commands are used to interrogate the hardware. They operate significantly faster than the general purpose routines provided with the data acquisition board.

While the routine is waiting for the detection of a sync pulse, a "Waiting for sync" message appears on the CRT. Under normal operating conditions, a sync pulse occurs within one revolution of the acoustic mirror 156 and as a result, the signal is seen immediately and no message is output.

Turning now to the AcqEcho subroutine 338, the start of this process is not critical due to the fact that the actual data acquisition timing is controlled by appropriate timing pulses driven by the signal processing means 106. This subroutine is invoked by the main routine once the sync pulse has been detected. The routine starts the data acquisition process and then continually monitors that process for successful completion. Once completion has been determined, the data is stored in an array and control is returned back to the main driving routine. The index to the array is not reset but allowed to continue to increment. Upon completion of the entire scan area, Echoarray& is a 256×192 array containing the scanned data.

The actual amount of scanned data that is taken by the system is 256×192 points. In order to store a more uniform file, however, the data is padded with an additional 64 rows to give an even 256×256 pixels. The actual scanned data lies in the center of the stored (and displayed) data and the additional 64 rows are divided into 32 each before and after the scanned data. A grey scale value of 256 is given to the fill data. This results in an all white area to be displayed on the monochrome CRT.

After an entire line has been scanned in the y-axis, the stepper motor 160 and thus mirror 156 must be positioned to the next line in the x-axis in preparation for the next scan. This positioning is accomplished by the step motor subroutine 340 which refers to the step motor included in linear actuator 160. This subroutine is invoked everytime the main routine detects the fact that an entire line has been scanned. The subroutine then issues a series of pulses to the motor controller by toggleing bit 2 of port B on the data acquisition board. The amount of pulses delivered to the motor controller is such that the resultant linear motion as seen by the probe assembly is approximately 0.006". Thus, should an increase or decrease in the lateral 'x' resolution be desired, then the number of pulses delivered to the motor controller as defined by this subroutine must be modified.

An image is comprised of 192 individual scan lines. The Updatey subroutine 342 is responsible for keeping track of how many scan lines have been scanned already. Once a count of 192 has been reached, the return code from the subroutine is such that the main program realizes that the scan is complete and it is time to rewind the motor 160. Furthermore, it is the responsibility of this subroutine to reset its internal counter to zero in preparation for a new scan. The variable mtrptr% is used to keep track of the count and is compared to a constant 192. Therefore, should a larger size scan in the y direction be required, then this constant must be changed or replaced by a variable that is initialized as part of the program initialization procedure.

Once the entire scan has been performed, software control is passed to the rewind motor subroutine 336. The purpose of this subroutine is to position the stepper motor 160 back to the original starting point in preparation for another scan. Since the actual number of scan lines that the stepper motor 160 moves is 192, the motor must be stepped in the reverse direction 192 steps. However, there is a certain amount of mechanical flex that can be found in the system with respect to the positioning system. The first several steps made by the stepping motor 160 which is a direction opposite to that which it has been traveling, do not cause the probe 102 to step in that direction but rather are used to take the backlash out of the system. In order to position the system back to its true starting point in preparation for a new scan, the stepper motor 160 must be rewound past the point at which it started and then stepped forward to its actual starting point. In doing so, the effect of the mechanical backlash of the system is eliminated (or at least minimized). Therefore, when the software issues the first real step command during a scan, the command will actually cause the probe to move, as opposed to simply flexing the entire assembly.

The Storeit subroutine 346 is responsible for scaling the scanned data appropriately, formatting it and storing it onto hard disk under a user defined file name. This routine, due to the amount of data it must handle as well as the extensive I/O that it must perform, is a relatively time consuming process. It cannot be called during the actual data acquisition process since it would cause the sync timing pulse to be missed. Therefore, this subroutine is invoked by the main program once the entire scan process has been completed. It is the responsibility of the main driving routine to query the user if the scanned data is to be saved or not and if so, under what file name. This file name is then passed to the Storeit subroutine where an empty file is opened up on the hard disk and the data is stored.

Figure 23:
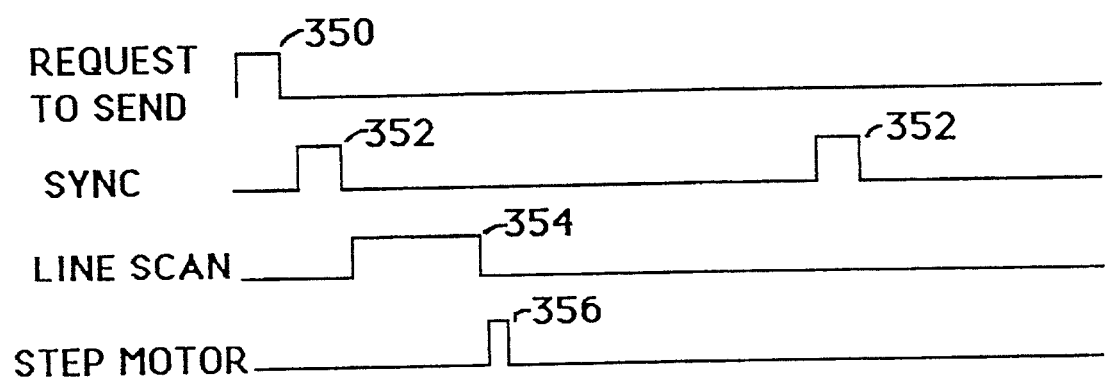
FIG. 23 is a graph including waveforms providing a timing diagram illustrating operation of the program of FIG. 22.

The timing diagram of FIG. 23 shows the relationship between the request to scan 350, synchronization 352, line scan 354 and step motor 356 pulses, respectively.

in view of the foregoing, the present invention is directed primarily toward the imaging of surface topology using ultrasound, with specific emphasis on the application to fingerprint imaging. However, the system of the present invention is capable of scanning any surface topology other than fingerprints so long as the acoustic impedance mismatch between the object to be scanned and the surface of the lens is close enough to allow part of the ultrasound wave to propagate into the material. Therefore, for certain materials, an acoustic coupling agent may be highly desirable. Such coupling agents come in many forms for use on many different materials. In addition, the ability of the system of the present invention to scan beneath the surface of an object presents a capability not found in optical systems. In the case of performing personal identification, the use of subdermal structures such as blood vessels as the individual's characteristic trait is made possible with the use of the present invention.

Another aspect of the present invention involves the relationship existing between the general wave theory governing the diffraction pattern of ultrasound in the far field and the ability to detect unique two dimensional features. It is known that the far field diffraction pattern of an acoustic wave reflecting off the surface of an object is the two dimensional Fourier transform of the surface topology of that object. Therefore, in accordance with this aspect of the present invention, if the ability to perform fingerprint pattern recognition in the spatial frequency domain can be demonstrated, then an ultrasonic sensor can be provided according to the present invention, to perform this processing automatically as part of the wave propagation. The following description deals with the concept of fingerprint analysis performed in the spatial frequency domain.

The problem of two-dimensional pattern recognition and the development of various robust algorithms has received much attention over the years. One of the many approaches to automating the recognition of two-dimensional patterns has been to analyze, or filter out from the overall scene, those spatial frequency components not associated with a particular pattern. That is, considering a two-dimensional pattern as a function g(x,y), then the spatial frequency components of this function are given by its two-dimensional Fourier transform:

$$F(g(x,y))=G(f_x,f_y)=g(x,y) \exp [-j2(f_xx+f_yy)]dxdy$$

where $f_x$ and $f_y$ are referred to as the spatial frequencies of g and have units of cycles per unit distance as measured in the plane g(x,y). Thus, by the application of the two-dimensionsal Fourier transform, the spatial frequency components for a given scene (or pattern) can be obtained. Once these frequencies components have been obtained, then a spatial filter can be applied to reject or pass those spatial frequencies associated with the particular pattern that is trying to be identified. A modified scene is then produced by the application of an inverse Fourier transform as defined by $$F^{-1}(G(f_x,f_y)=G(f_x,y) \exp [j2(f_xx+f_yy)]df_xdf_y$$

Figure 24:
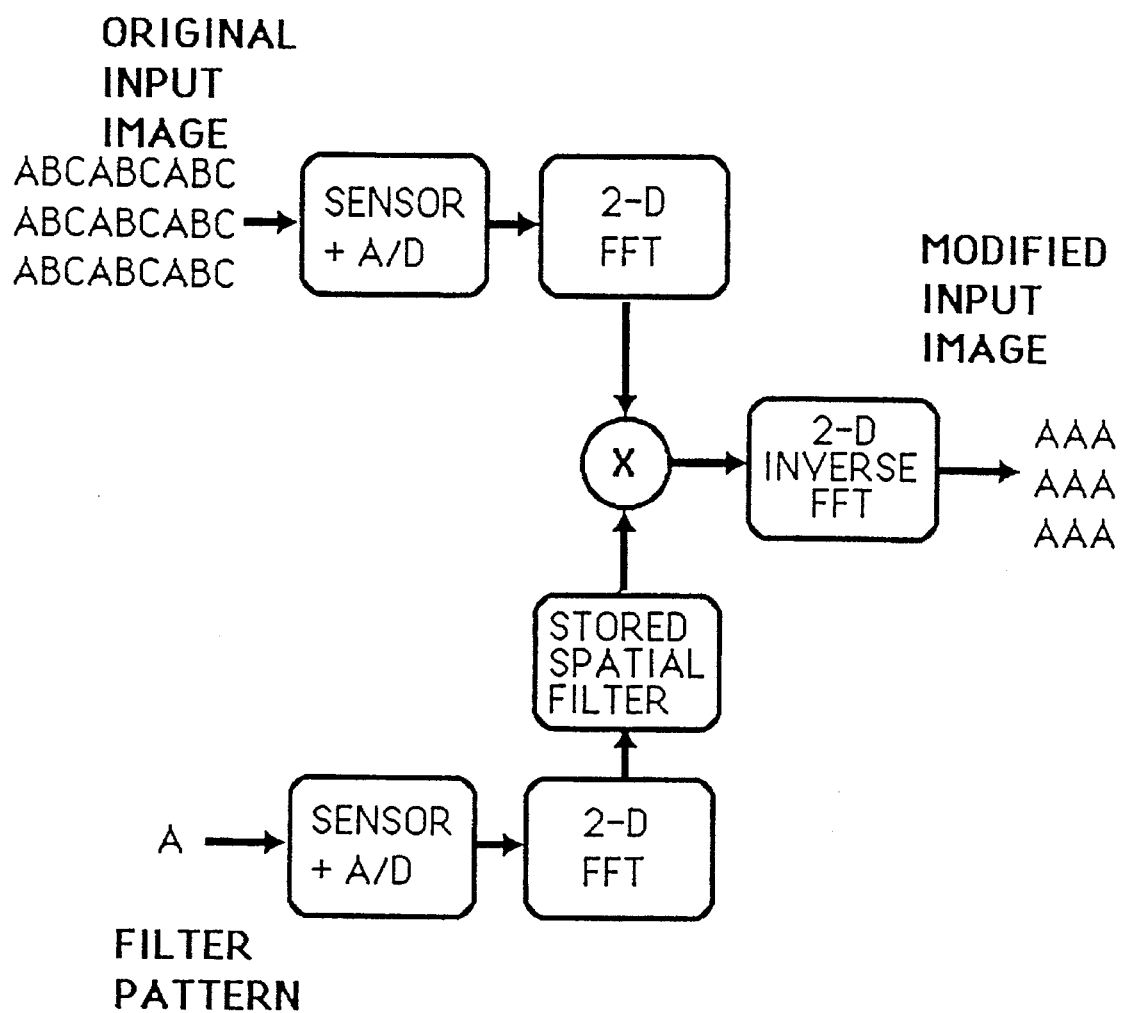
FIG. 24 is a block diagram illustrating a character recognition system based on spatial filtering.

The modified scene will have only those patterns in it whose spatial frequency components were allowed to pass. A block diagram of a basic system based on the foregoing is given in FIG. 24.

Figure 25:
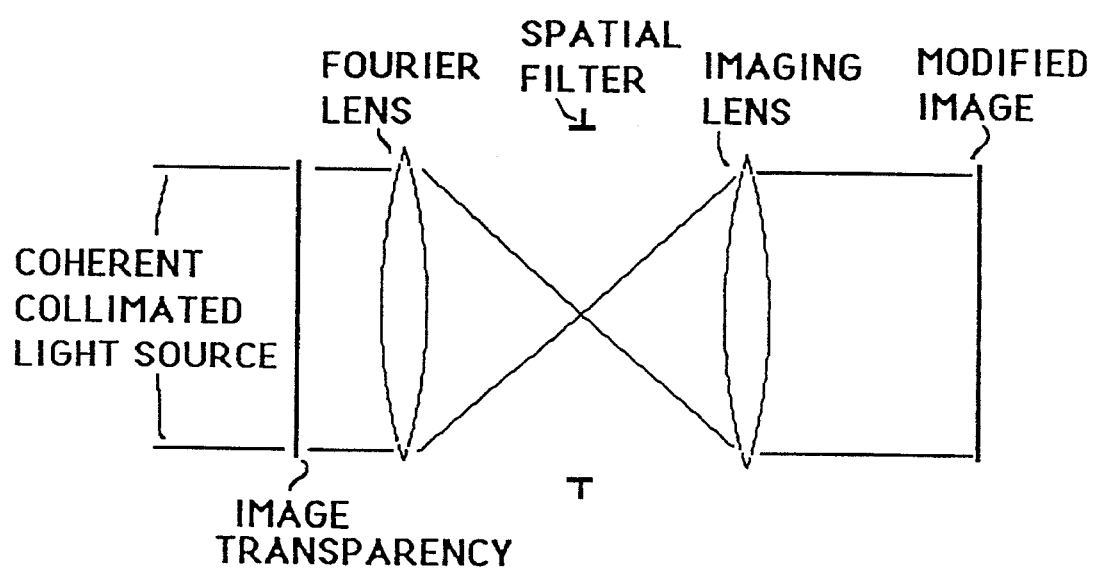
FIG. 25 is a schematic diagram of an illustrative optical spatial filtering system.

It is known shown how to carry out the Fourier transform optically through the use of a relatively simplistic lensing system. The basis for this optical transformation is that under certain conditions (and approximations), the diffraction pattern of a two-dimensional object is itself the two-dimensional Fourier transform of that object. These approximations, one of which is the Fraunhoffer approximation, are often made when dealing with wave propagation. A typical lensing system and its ability to perform spatial filtering is shown in FIG. 25.

As a result of the ability to generate the two-dimensional Fourier transform optically, a number of systems targeted at character recognition have been provided. A common goal was to be able to perform pattern -recognition on typed characters using matched spatial filters. The overall advantage resided in the fact that the Fourier transform is a linear-shift-invariant operation as well as being unique. That is, there is no loss of information when working with an image in the frequency domain as compared to the original image data domain. This form of coherent processing allows for the parallel searching of all possible positions of the pattern as opposed to the time consuming process of performing template matching on all spatial locations. All of these systems experienced varying degrees of success and suffered from similar problems or deficiencies. Specifically, the spatial filter that was created was matched (contained both amplitude and phase information) to a particular pattern with a particular orientation and size. It was not only difficult to record the phase information for a particular filter on photographic film, but changes in either orientation or size caused an overall degradation in the system's ability to perform recognition. As a result, a number of different approaches were employed to generate both scale and rotationally invariant transformations as well as implement multiple spatial filters and replace the photographic film with a spatial light modulator. Again, all of these approaches experienced varying degrees of success.

In addition to character recognition, much attention was being directed towards general scene analysis or pattern recognition in the spatial frequency domain, and one pattern of particular interest was the fingerprint. One investigator experimented with the concept of looking at the ennire fingerprint in the spatial frequency domain. If the process of fingerprint identification in the spatial frequency domain could be accomplished, then a high speed optical processor could be built to perform the recognition. Essentially, there were three obstacles to this approach. The first is that the spectrum resulting from the 2-D Fourier Transform is so complex and contains so many different, yet significant, spatial frequencies that the matching process becomes virtually impossible. Small variations in scale and rotation caused enough of a change in the spectrum so that the matching process became uncertain.

The second problem with this approach lies in the area of compatibility. To date no existing law enforcement agency or known private sector personal identification system uses the approach of viewing the entire fingerprint pattern for identification. in most law enforcement systems the entire fingerprint is not stored internal to the computer due to the tremendous storage requirements. Thus, an approach not compatible with the existing database which has been gathered over several decades would have tremendous difficulty in being adopted or even reviewed.

Finally, since much of the fingerprint identification process is performed on latent prints where only a partial print is possible, matching the spectrum of the partial print to the spectrum of the entire print makes partial print identification difficult or impossible.

Despite the above mentioned deficiencies, the need for a new approach to fingerprint processing is constantly growing. The ever increasing number of fingerprint cards that are processed every day by law enforcement agencies is resulting in large amounts of dedicated custom image processors in order to keep up with demand. In accordance with the present invention, by providing an upfront sensor in which much of the computationally intensive tasks could be performed as part of the natural wave propagation at throughputs far exceeding that of the digital computer, then overall system throughput can be increased while decreasing the complexity of the central processing unit. Recently, it has shown that it is possible to obtain the spatial frequency components of the surface topology of an object ultrasonically through pulse-echo imaging in accordance with the present invention, it is believed that analyzing the fingerprint in the spatial frequency domain will be advantageous. This can be accomplished, according to the present invention, by an ultrasonic sensor which is capable of scanning a finger directly and returning its spatial frequency components.

Figure 26:
FIG. 26 is an enlarged image of a portion of a finger print illustrating a bifurcation and a ridge ending.

As previously mentioned, automatic fingerprint reader systems (AFRS's) have been in use for a number of years. These devices comprise a number of highly customized, highspeed, dedicated processors, and their sole purpose is to optically scan an inked image of a fingerprint into a computer for analysis. The analysis consists of the repeated application of a number of image enhancement/pattern recognition algorithms in order to characterize the fingerprint. The characterization of the fingerprint consists of identifying the location of each minutiae of the fingerprint in x,y space (an arbitrary but fixed cartesian coordinate system) and its angle of orientation (theta) with respect to one of the axes of the coordinate system. A minutia is defined as either a bifurcation or ridge ending. That is, when a ridge of a fingerprint that is traveling along a particular path suddenly splits into two separate and distint ridges or combines with another ridge to form a single ridge, then the transition point is referred to as a bifurcation. Similarly when a ridge that is traveling along a particular path suddenly ends, a ridge ending is formed. It is the identification in x,y,theta of the bifurcations and ridge endings, i.e. minutiae, that is used (among other things) to determine if a match between two prints exist. An example of a bifurcation (left) and ridge ending (right) is given in FIG. 26.

An interesting and important observation can be made in studying the bifurcation and ridge ending. That is, a bifurcating ridge is the same as a ridge ending valley (the space between the ridges). Likewise, a ridge ending is she same as a bifurcating valley. In other words, by taking the complement of an image of a fingerprint (i.e. reverse video), all ridge endings become bifurcations and all bifurcations become ridge endings. Furthermore, since it is virtually impossible to determine whether one is viewing a true image of a fingerprint or a reverse video image, the decision was made many years ago by the law enforcement community to map both bifurcations and ridge endings. This decision thus eliminated the need to know what type of image was being processed since the end result was the same. This is an important fact that forms the basis of the algorithm employed in the present invention.

Generally, the problems experienced in character recognition systems based on matched spatial filters were amplified due to the large number of different filters required for all the potential patterns and orientations. Given a limited number of patterns with a limited number of scale and rotational variations, then the above approach becomes workable.

As previously mentioned, attempts have been made to transform the entire fingerprint into the spatial frequency domain and then perform the matching process. One of the advantages of transforming the image to the spatial frequency domain is the shift-invariance nature of the Fourier transform requiring only scale and rotational variations to be considered. However, these variations were significant obstacles when dealing with a complex spectrum such as that resulting from the transform of an entire fingerprint. Thus, this approach suffers from the same problems as does the character recognition schemes. Too many different characters requiring too many different filters or too complex of a frequency spectrum to be easily analyzed. A 'typical' fingerprint and its 2-D Fourier transform representation are given in FIG. 27 and 28, respectively. It should be noted that FIG. 27 was obtained by optically scanning an inked image of a fingerprint as opposed to the actual finger itself.

The approach according to the present invention divides the entire fingerprint into n×n windows of m×m size. The window is selected large enough so as to encompass an entire minutiae (ridge ending or bifurcation) yet small enough to keep the spatial frequency plane representation simple. The window is then stepped around the entire fingerprint. After each step a 2-D Fourier transform is performed. This is the algorithm according to the present invention. In selecting a small window, it is easy to identify the presence or absence of a minutia due to the fact that the pattern formed by the spatial frequency components is not only different from a non-minutia window but is an extremely simple pattern to search for. The advantage of frequency plane analysis is in the shift invariance nature of the Fourier transform. If the window were large enough to encompass the entire minutia, then the minutia could be located in a number of (x,y) positions within that space requiring an extensive search in the original plane. Applying the Fourier transform to the window prior to analysis reduces this multipoint search to a single point search. Scale and rotational variations still have the same effect on the spatial frequency domain image but since the pattern being transformed is much simpler by nature, the effects of scale and rotational variations are much more easily identifiable than when trying to view the entire print.

Figure 29:
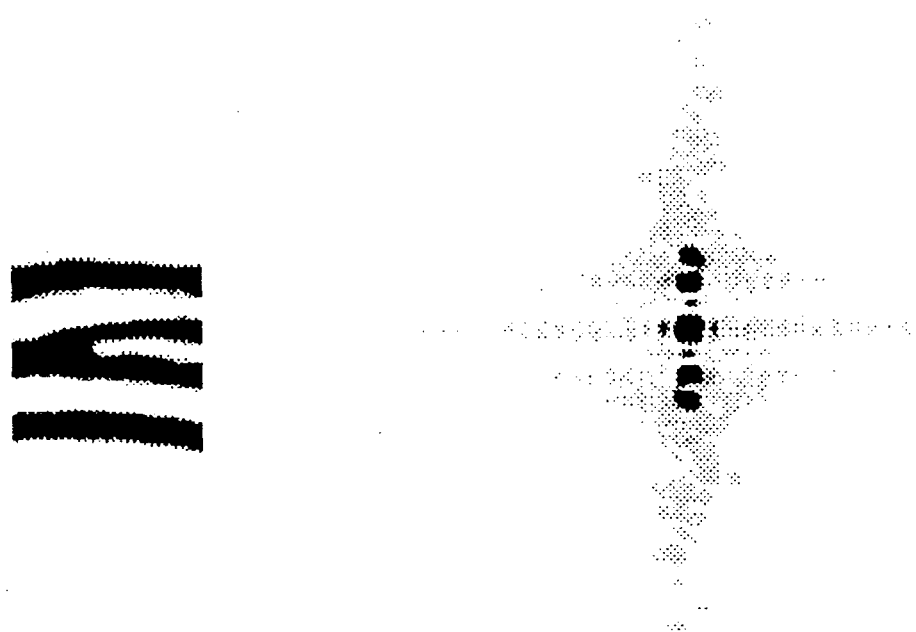
FIG. 29 is an enlarged image of a fingerprint bifurcation and the psatial frequency representation thereof.
Figure 30:
FIG. 30 is an enlarged image of a fingerprint ridge edning and the spatial frequency representation thereof.
Figure 31:
FIG. 31 is an enlarged image of a fingerprint parallel ridge structure and the spatial frequency representation thereof.

FIGS. 29, 30 and 31 are three windows containing at the left-hand side of each view a bifurcation, ridge ending and no minutia, respectively. The magnitude of the corresponding spatial frequencies resulting from a 256×256 point Fast Fourier transform (along with some simple contrast enhancement operators) are also given at the right-hand side of each view. As is readily seen, the spatial frequency components associated with a minutia are quite distinctive and relatively simple. Understanding the spectrums generated by each of the images is important. In studying the input image of each minutia, it is easily seen that the ridge count (the number of fingerprint ridges) when viewed along the vertical axis is different from one side of the minutia to another. In the case of the bifurcation shown in FIG. 29, traversing the left most region of the image along the vertical axis, we obtain a ridge count of 3, whereas traversing the right most vertical region we obtain a ridge count of 4. Performing a similar process on the image of the ridge ending minutia in FIG. 30, we obtain a ridge count of 3 and 2 respectively. It is these ridge counts that essentially are transformed into a particular spatial frequency. Since for a minutia we see that the ridge count varies from 'side to side', we obtain 2 spatial frequency components as can be seen by the double dots just above and below the origin in the frequency spectrum representation found in FIGS. 29 and 30. This is in contrast to the non-minutia image of FIG. 31. We see here that the ridge count of the non-minutia structure does not vary as we traverse the image but remains a constant value of two. Therefore the transform results in only a single significant spatial frequency as depicted by the presence of a single dot just above and below the origin of the frequency spectrum representation as found in FIG. 31. The search for the presence or absence of a minutia is now reduced to the determination of a double versus single spatial frequency, respective (i.e. 2 'dots' verus 1 'dot'). Any small changes in the size and shape of the minutia merely create a shift in the relative position and spacing of the frequency components. Since we are not interested in absolute spatial frequency values but are merely looking for a pattern formed by the spatial frequencies, these changes in size and shape do not affect the approach. Thus, by definition, the approach is made invariant to the size and shape of the minutiae within certain limits.

Figure 28:
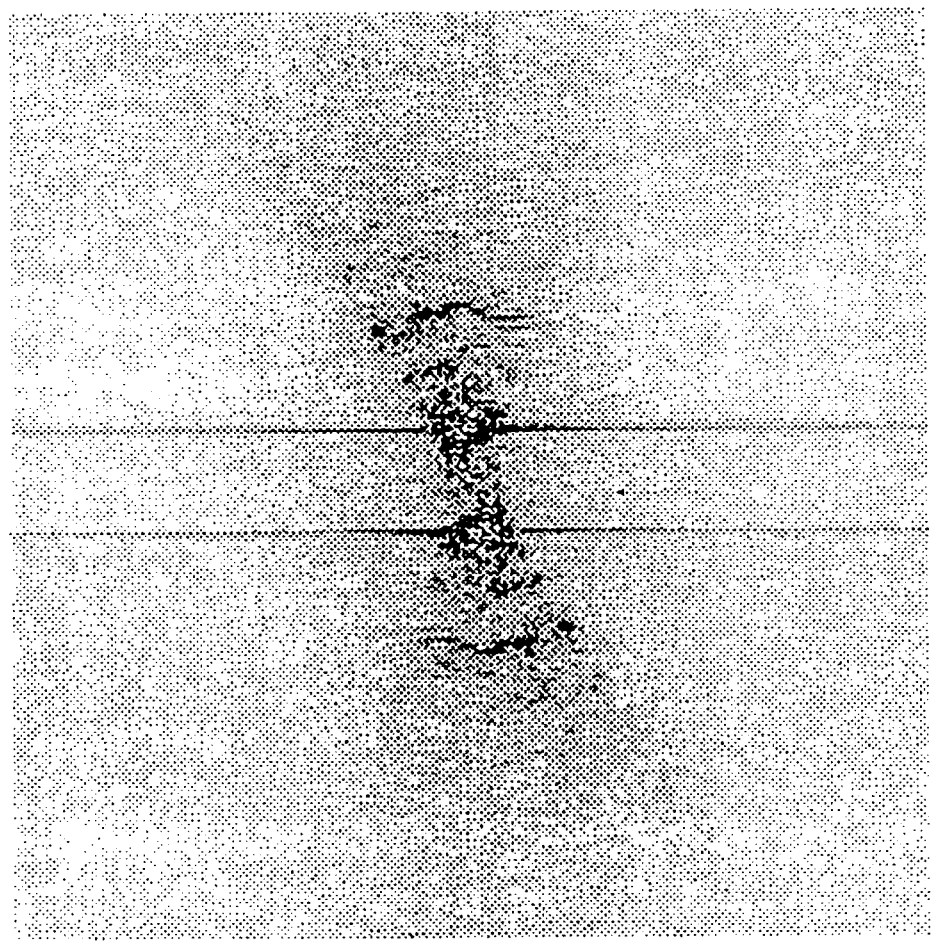
FIG. 28 is a spatial frequency representation of the fingerprint image of FIG. 27.

Searching for the presence of a pattern like with limited scale variations and unlimited rotational variations is significantly easier than the spectrum presented earlier in FIG. 28. It should be noted that the only difference between the spectrums of the bifurcation versus the ridge endings lies in those frequency components associated with the ridge structure directly at and immediately surrounding the junction of the bifurcation. These components are so small however that they are easily removed through thresholding, resulting in a spatial frequency pattern virtually identical for either ridge endings or bifurcations.

In order to establish some bas is for acceptance, a port ion of a fingerprint given in FIG. 27 was processed using spatial frequency analysis. The results of this processing was then visually checked against the actual image to determine if any minutiae failed to be identified or, conversely, any false minutia were reported. The results of this processing resulted in the detection of all six minutia present in the print of FIG. 27. The output of the 2-D Fourier transform for each of the detected minutia is presented in FIGS. 32a–f, respectively. Furthermore, FIG. 33 provides a map of the detected minutiae indicated by a circle and their direction as indicated by the "tail" of the circle.

By way of illustration, the implementation of such a technique using ultrasonic diffraction would require the replacement of the single element transducer 140 with a multielement phased array transucer and for each element of the phased array transucer, a copy of the signal processing electronics as presented herein in FIG. 21. The cost of such a system would be significant unless the multiple copies of the signal processing electronics could be reduced using custom integrated circuitry.

It is therefore apparent that the present invention accomplishes its intended objects. Ultrasound has been employed as an alternate approach to optical surface scanning based on frustrated total internal reflection. This new approach has the potential for better performance than previously used optical approaches by eliminating many of the problems associated with the optical approach. Feasibility has been demonstrated through consideration of available acoustic imaging systems as well as providing an actual system. Fingerprint images of high quality have been captured to demonstrate that concerns such as lateral resolution and repeatability have been overcome. The approach of the present invention is quite feasible and even preferable over the optical approach based on Frustrated Total Internal Reflection. The present invention also employs ultrasound as a means of obtaining an image of the ridge structure of the finger. Furthermore, the data collected and presented clearly shows an image of high quality, absent of the multitude of discontinuities characteristic of the optical based systems due to the inability to image through small air pockets that become trapped between the finger and the surface of the scanner. The approach of analyzing the fingerprint image in the spatial frequency domain also is presented.

What is claimed is:

1. A method for ultrasonic imaging of human or animal tissue having a surface comprising the steps of:

a. rigidly supporting said surface of human or animal tissue for imaging the same over the area of an image plane;

b. focusing and directing an ultrasonic beam onto said surface and in a direction always substantially perpendicular to said image plane so as to provide a predetermined spot size at the focal point of said beam to provide high lateral resolution imaging in a plane substantially perpendicular to the direction of said beam;

c. performing a C-mode ultrasonic scan over a fixed area of said surface utilizing said ultrasonic beam; and d. applying range gating to said area at a selected location from the surface to a given depth beneath said surface.

2. A method according to claim 1, wherein said step of performing a C-mode scan comprises providing a parallel beam propagation for capturing an image along a plane perpendicular to the propagation path of the ultrasonic energy.

3. A method according to claim 1, wherein said step of performing a C-mode scan comprises:
   a) performing a collimated B-mode scan with range gating; and
   b) stacking the output of multiple range gated collimated B-mode scans together to obtain a two dimensional C-scan geometry and the desired image.

4. A method according to claim 1, wherein said ultrasonic beam is directed substantially normal to said surface.

5. A method according to claim 6, wherein said step of rigidly supporting said human or animal tissue during imaging is performed by means of a body of a material having an acoustic impedance substantially matching the acoustic impedance of the tissue being imaged.

6. A method according to claim 1, wherein said ultrasonic beam is propagated through a liquid medium providing relatively low attenuation at the frequency of said beam.

7. Apparatus for ultrasonic imaging of human or animal tissue having a surface, said apparatus comprising:
   a. means for rigidly supporting said surface of human or animal tissue for imaging the same over the area of an image plane;
   b. means for providing an ultrasonic beam focused and directed onto said surface and in a direction always substantially perpendicular to said image plane so as to have a predetermined spot size at the focal point of said beam to provide high lateral resolution imaging in a plane substantially perpendicular to the direction of said beam;
   c. means for performing a C-mode ultrasonic scan over a fixed area of said surface utilizing said ultrasonic beam; and
   d. means for applying range gating to said area at a selected location from said surface to a given depth beneath said surface.

* * * * *

UNITED STATES PATENT AND TRADEMARK OFFICE
CERTIFICATE OF CORRECTION

PATENT NO. : 5,587,533
DATED : December 24, 1996
INVENTOR(S) : John K. Schneider et al It is certified that error appears in the above-identified patent and that said Letters Patent are hereby corrected as shown below:

Col. 29, line 13 - "claim 6" should be --claim 1--.

Signed and Sealed this

Twenty-ninth Day of April, 1997

Attest:

BRUCE LEHMAN

Attesting Officer    Commissioner of Patents and Trademarks